US012739752B2

(12) United States Patent
Sun

(10) Patent No.: US 12,739,752 B2
(45) Date of Patent: Sep. 15, 2026

(54) WAKEUP METHOD AND APPARATUS, AND ELECTRONIC DEVICE

(71) Applicant: Honor Device Co., Ltd., Shenzhen (CN)

(72) Inventor: Xiaoyu Sun, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 448 days.

(21) Appl. No.: 18/569,060

(22) PCT Filed: Sep. 9, 2022

(86) PCT No.: PCT/CN2022/118235

§ 371 (c)(1),
(2) Date: Dec. 11, 2023

(87) PCT Pub. No.: WO2023/065886

PCT Pub. Date: Apr. 27, 2023

(65) Prior Publication Data

US 2024/0155499 A1 May 9, 2024

(30) Foreign Application Priority Data

Oct. 21, 2021 (CN) ......................... 202111228030.4

(51) Int. Cl.
*H04W 52/02* (2009.01)

(52) U.S. Cl.
CPC ............................... *H04W 52/0248* (2013.01)

(58) Field of Classification Search
CPC ......... H04W 52/0248; H04W 52/0235; H04W 52/0216; H04W 52/0209; H04W 72/0453;
(Continued)

(56) References Cited

U.S. PATENT DOCUMENTS 8,274,313 B2 * 9/2012 Liu ........................ G01R 23/15
327/39
9,525,540 B1 * 12/2016 Shellhammer ........ H04L 5/0053
(Continued)

FOREIGN PATENT DOCUMENTS

CN 110235420 A 9/2019
CN 110798300 A 2/2020
(Continued)

*Primary Examiner* — Marcos L Torres
(74) *Attorney, Agent, or Firm* — Slater Matsil, LLP

(57) ABSTRACT

A wakeup method includes: A first signal processing circuit performs monitoring at a first frequency; a second signal processing circuit performs monitoring at a second frequency, where the second frequency is different from the first frequency; the second signal processing circuit receives a wakeup signal at the second frequency, where a bandwidth of the wakeup signal is less than a first value, the wakeup signal is transmitted by a first electronic device at a plurality of transmit frequencies or at a bandwidth greater than a second value, and the second value is greater than the first value; the first signal processing circuit performs monitoring at the second frequency; the second signal processing circuit performs monitoring at a third frequency, where the third frequency is different from both the first frequency and the second frequency; and the first signal processing circuit receives the wakeup signal at the second frequency.

20 Claims, 18 Drawing Sheets

(58) Field of Classification Search
CPC ...... H04W 72/541; H04W 72/56; H04B 1/16; Y02D 30/70
See application file for complete search history.

(56) References Cited

U.S. PATENT DOCUMENTS

| | | | |
|---|---|---|---|
| 10,531,454 | B2 | 1/2020 | Suh et al. |
| 11,452,042 | B2 | 9/2022 | Lin et al. |
| 11,943,713 | B2 | 3/2024 | Sjöland et al. |
| 2019/0268849 | A1 | 8/2019 | Lopez et al. |
| 2021/0084711 | A1 | 3/2021 | Park et al. |
| 2021/0211165 | A1 | 7/2021 | Wilhelmsson et al. |
| 2022/0123976 | A1 | 4/2022 | Mangal et al. |
| 2024/0155499 | A1 | 5/2024 | Sun |

FOREIGN PATENT DOCUMENTS

| | | | |
|---|---|---|---|
| CN | 111918371 | A | 11/2020 |
| CN | 112153703 | A | 12/2020 |
| CN | 113114147 | A | 7/2021 |
| CN | 114095995 | A | 2/2022 |
| WO | 2020119913 | A1 | 6/2020 |
| WO | 2020142792 | A1 | 7/2020 |

* cited by examiner

WAKEUP METHOD AND APPARATUS, AND ELECTRONIC DEVICE

CROSS-REFERENCE TO RELATED APPLICATIONS

This application is a national stage of International Application No. PCT/CN2022/118235, filed on Sep. 9, 2022, which claims priority to Chinese Patent Application No. 202111228030.4, filed on Oct. 21, 2021. The disclosures of both of the aforementioned applications are hereby incorporated by reference in their entireties.

TECHNICAL FIELD

This application relates to the field of terminal devices, and in particular, to a wakeup method and apparatus, and an electronic device.

BACKGROUND

For establishment of a connection between wireless electronic devices, first, a transmit end needs to transmit a specific group of wakeup signals, and a device to be woken up needs to receive the wakeup signals and correctly demodulate the wakeup signals, to implement effective wakeup and start to establish a connection. A conventional receiver architecture in the wireless electronic device includes devices with high power consumption, such as a low noise amplifier, a mixer, and an automatic gain controller. If a receiver is kept steadily on in a wait-for-wakeup phase, standby power consumption of the receiver is greatly increased. In a related technology, the standby power consumption of the receiver is reduced by reducing a duty cycle of the receiver, that is, the receiver periodically switches between a working state and a sleeping state. In this solution of reducing the duty cycle, the standby power consumption of the receiver can be effectively reduced, but a probability of waking up the receiver is reduced, and a wakeup delay is increased.

SUMMARY

To resolve the foregoing technical problem, this application provides a wakeup method and apparatus, and an electronic device, so that a wakeup signal with an extremely narrow bandwidth can be monitored at a plurality of frequencies, to increase a probability of successfully capturing the wakeup signal, and reduce a wakeup delay.

According to a first aspect, this application provides a wakeup method. The method includes: A first signal processing circuit performs monitoring at a first frequency; a second signal processing circuit performs monitoring at a second frequency, where the second frequency is different from the first frequency; the second signal processing circuit receives a wakeup signal at the second frequency, where a bandwidth of the wakeup signal is less than a first value, the wakeup signal is transmitted by a first electronic device at a plurality of transmit frequencies or the wakeup signal is transmitted by a first electronic device at a bandwidth greater than a second value, and the second value is greater than the first value; when a temperature drift occurs, the first signal processing circuit performs monitoring at the second frequency; the second signal processing circuit performs monitoring at a third frequency, where the third frequency is different from both the first frequency and the second frequency; and the first signal processing circuit receives the wakeup signal at the second frequency. In this way, the wakeup signal is monitored at a plurality of frequencies. This increases a probability of successfully capturing the wakeup signal, increases a probability of successfully waking up an electronic device, and reduces a wakeup delay. In addition, by performing monitoring at a plurality of frequencies, the wakeup signal can still be successfully captured when a temperature drift occurs. This effectively overcomes impact of the temperature drift.

For example, the wakeup method may further include: A third signal processing circuit performs monitoring at the third frequency; and after a temperature drift occurs, the third signal processing circuit performs monitoring at a fourth frequency, where the fourth frequency is different from all of the first frequency, the second frequency, and the third frequency. In this application, a plurality of signal processing circuits may be used to perform monitoring at a plurality of different frequencies. A larger quantity of signal processing circuits indicates a higher probability of successfully capturing the wakeup signal and a lower wakeup delay.

According to the first aspect, the method further includes: The first signal processing circuit outputs a first logical value, where the first logical value is used to indicate that the first signal processing circuit receives the wakeup signal; the second signal processing circuit outputs a second logical value, where the second logical value is used to indicate that the second signal processing circuit does not receive the wakeup signal; and a first logical OR operation circuit determines, based on the first logical value and the second logical value, that the wakeup signal is received. In this way, when either of the first signal processing circuit and the second signal processing circuit receives the wakeup signal, it can be determined that the wakeup signal is received. This improves receiving sensitivity. When a plurality of signal processing circuits are used, each signal processing circuit may output a logical value 1 if the signal processing circuit receives the wakeup signal, and may output a logical value 0 if the signal processing circuit does not receive the wakeup signal. The first logical OR operation circuit adds logical values output by all the signal processing circuits, and if the logical value 1 is obtained, determines that the wakeup signal is received. In this way, provided that at least one signal processing circuit receives the wakeup signal, it can be determined that the wakeup signal is received.

According to the first aspect, the first signal processing circuit includes an extremely narrow-band band-pass filter, an envelope detector, a comparator, and a correlator, an input end of the extremely narrow-band band-pass filter is coupled to an antenna, an input end of the envelope detector is coupled to an output end of the extremely narrow-band band-pass filter, an input end of the comparator is coupled to an output end of the envelope detector, and an input end of the correlator is coupled to an output end of the comparator. In this case, that the first signal processing circuit receives the wakeup signal at the second frequency may include: The extremely narrow-band band-pass filter performs extremely narrow-band band-pass filtering on a first signal detected at the second frequency, to obtain a filtered signal with an extremely narrow bandwidth; the envelope detector extracts an amplitude envelope of the filtered signal to obtain a baseband pulse signal; the comparator compares a voltage of the baseband pulse signal with a reference voltage to obtain a first digital signal sequence; and the correlator obtains a first correlation indicator value between the first digital signal sequence and a preset wakeup sequence, and compares the first correlation indicator value with a preset correlation threshold to obtain a correlation comparison result, where when the correlation comparison result indicates that the first correlation indicator value is greater than the correlation threshold, the first signal is a wakeup signal. In this way, by performing filtering at an extremely narrow bandwidth, more noise and interference can be filtered out, and therefore an anti-interference capability is improved.

According to the first aspect, the comparator includes a first comparator and a second comparator, and an input end of the first comparator and an input end of the second comparator are separately coupled to the output end of the envelope detector; the correlator includes a first correlator and a second correlator, an input end of the first correlator is coupled to an output end of the first comparator, and an input end of the second correlator is coupled to an output end of the second comparator; and the first signal processing circuit further includes a second logical OR operation circuit, and an output end of the first correlator and an output end of the second correlator are separately coupled to an input end of the second logical OR operation circuit. In this case, that the comparator compares a voltage of the baseband pulse signal with a reference voltage to obtain a first digital signal sequence includes: The first comparator compares the voltage of the baseband pulse signal with a first reference voltage to obtain a first candidate digital signal sequence; and the second comparator compares the voltage of the baseband pulse signal with a second reference voltage to obtain a second candidate digital signal sequence, where the second reference voltage is different from the first reference voltage. In this case, that the correlator obtains a first correlation indicator value between the first digital signal sequence and a preset wakeup sequence, and compares the first correlation indicator value with a preset correlation threshold to obtain a correlation comparison result, where when the correlation comparison result indicates that the first correlation indicator value is greater than the correlation threshold, the first signal is a wakeup signal includes: The first correlator obtains a first candidate value of a first correlation indicator value between the first candidate digital signal sequence and the preset wakeup sequence, and compares the first candidate value of the first correlation indicator value with the preset correlation threshold to obtain a first correlation comparison result; the second correlator obtains a second candidate value of a first correlation indicator value between the second candidate digital signal sequence and the preset wakeup sequence, and compares the second candidate value of the first correlation indicator value with the preset correlation threshold to obtain a second correlation comparison result; and the second logical OR operation circuit performs a logical OR operation on the first correlation comparison result and the second correlation comparison result to obtain a first logical OR operation result, where when the first logical OR operation result indicates that at least one of the first candidate value of the first correlation indicator value and the second candidate value of the first correlation indicator value is greater than the preset correlation threshold, the first signal processing circuit receives the wakeup signal at the second frequency. In this way, in each signal processing circuit, a plurality of comparators with different reference voltages are separately used to perform comparison with the voltage of the baseband pulse signal, and the different reference voltages correspond to different distances, so that when there is a different distance between two wireless electronic devices, at least one comparator can output an accurate wakeup sequence, to successfully wake up a primary transceiver in the electronic device, and improve sensitivity.

For example, the comparator may be a group of comparators, and a quantity of comparators in the group of comparators may be greater than 2. A reference voltage of each comparator in the group of comparators is adapted to a preset distance, and different comparators have different reference voltages. In this way, when there is a different distance between the two wireless electronic devices, there is a comparator that has a reference voltage corresponding to the distance, so that a wakeup sequence in the wakeup signal can be accurately obtained, to successfully perform wakeup. It can be learned that the sensitivity can be significantly improved by using a plurality of comparators with different reference voltages.

According to the first aspect, the first signal processing circuit includes an extremely narrow-band band-pass filter, an envelope detector, a comparator including an integrator circuit, and a correlator, an input end of the extremely narrow-band band-pass filter is coupled to an antenna, an input end of the envelope detector is coupled to an output end of the extremely narrow-band band-pass filter, an input end of the comparator including the integrator circuit is coupled to an output end of the envelope detector, and an input end of the correlator is coupled to an output end of the comparator including the integrator circuit. In this case, that the first signal processing circuit receives the wakeup signal at the second frequency includes: The extremely narrow-band band-pass filter performs extremely narrow-band band-pass filtering on a first signal detected at the second frequency, to obtain a filtered signal with an extremely narrow bandwidth; the envelope detector extracts an amplitude envelope of the filtered signal to obtain a baseband pulse signal; the comparator including the integrator circuit converts the baseband pulse signal into a single pulse signal, and compares a voltage of the single pulse signal with a reference voltage to obtain a second digital signal sequence; and the correlator obtains a second correlation indicator value between the second digital signal sequence and a preset wakeup sequence, and compares the second correlation indicator value with a preset correlation threshold to obtain a correlation comparison result, where when the correlation comparison result indicates that the second correlation indicator value is greater than the preset correlation threshold, the first signal is a wakeup signal. The integrator circuit can accumulate a voltage of the baseband pulse signal to form a corresponding single pulse signal. In this way, accuracy of a digital signal sequence output by the comparator can be improved, and overall sensitivity can be improved.

According to the first aspect, the comparator including the integrator circuit includes a third comparator and a fourth comparator, each of the third comparator and the fourth comparator includes an integrator circuit, and an input end of the third comparator and an input end of the fourth comparator are separately coupled to the output end of the envelope detector; the correlator includes a third correlator and a fourth correlator, an input end of the third correlator is coupled to an output end of the third comparator, and an input end of the fourth correlator is coupled to an output end of the fourth comparator; and the first signal processing circuit further includes a second logical OR operation circuit, and an output end of the third correlator and an output end of the fourth correlator are separately coupled to an input end of the second logical OR operation circuit. In this case, that the comparator including the integrator circuit converts the baseband pulse signal into a single pulse signal, and compares a voltage of the single pulse signal with a reference voltage to obtain a second digital signal sequence includes: The third comparator converts the baseband pulse signal into a single pulse signal, and compares a voltage of the single pulse signal with a third reference voltage to obtain a third candidate digital signal sequence; and the fourth comparator converts the baseband pulse signal into a single pulse signal, and compares a voltage of the single pulse signal with a fourth reference voltage to obtain a fourth candidate digital signal sequence, where the fourth reference voltage is different from the third reference voltage. In this case, that the correlator obtains a second correlation indicator value between the second digital signal sequence and a preset wakeup sequence, and compares the second correlation indicator value with a preset correlation threshold to obtain a correlation comparison result, where when the correlation comparison result indicates that the second correlation indicator value is greater than the preset correlation threshold, the first signal is a wakeup signal includes: The third correlator obtains a first candidate value of a second correlation indicator value between the third candidate digital signal sequence and the preset wakeup sequence, and compares the first candidate value of the second correlation indicator value with the preset correlation threshold to obtain a third correlation comparison result; the fourth correlator obtains a second candidate value of a second correlation indicator value between the fourth candidate digital signal sequence and the preset wakeup sequence, and compares the second candidate value of the second correlation indicator value with the preset correlation threshold to obtain a fourth correlation comparison result; and the second logical OR operation circuit performs a logical OR operation on the third correlation comparison result and the fourth correlation comparison result to obtain a second logical OR operation result, where when the second logical OR operation result indicates that at least one of the first candidate value of the second correlation indicator value and the second candidate value of the second correlation indicator value is greater than the preset correlation threshold, the first signal is a wakeup signal. In this way, in each signal processing circuit, a plurality of comparators with different reference voltages are separately used to perform comparison with the voltage of the baseband pulse signal, and the different reference voltages correspond to different distances, so that when there is a different distance between two wireless electronic devices, at least one comparator can output an accurate wakeup sequence, to successfully wake up a primary transceiver in the electronic device, and improve sensitivity.

According to the first aspect, the first frequency and the second frequency are adjacent frequencies. In this way, when a temperature drift occurs and the temperature drift is relatively small, a probability that the signal processing circuit receives the wakeup signal at the adjacent frequency is increased, thereby increasing a probability of successful wakeup.

According to the first aspect, the first frequency and the second frequency are non-adjacent frequencies. In this way, when a temperature drift occurs and the temperature drift is relatively large, a probability that the signal processing circuit receives the wakeup signal at the non-adjacent frequency is increased, thereby increasing a probability of successful wakeup.

According to the first aspect, the plurality of transmit frequencies include at least one of the first frequency and the second frequency. In this way, a probability of receiving the wakeup signal can be increased, thereby increasing a probability of successful wakeup.

According to the first aspect, at least one of the first frequency and the second frequency falls within the bandwidth at which the first electronic device transmits the wakeup signal. In this way, a probability of receiving the wakeup signal can be increased, thereby increasing a probability of successful wakeup.

According to a second aspect, this application provides a wakeup apparatus. The wakeup apparatus includes: a first signal processing circuit, where the first signal processing circuit is coupled to an antenna, and is configured to perform monitoring at a first frequency; and a second signal processing circuit, where the second signal processing circuit is coupled to the antenna, and is configured to perform monitoring at a second frequency. The second frequency is different from the first frequency. When no temperature drift occurs, the second signal processing circuit is further configured to receive a wakeup signal at the second frequency. A bandwidth of the wakeup signal is less than a first value. The wakeup signal is transmitted by a first electronic device at a plurality of transmit frequencies or at a bandwidth greater than a second value. The second value is greater than the first value. When a temperature drift occurs, the first signal processing circuit is further configured to perform monitoring at the second frequency. The second signal processing circuit is further configured to perform monitoring at a third frequency. The third frequency is different from both the first frequency and the second frequency. The first signal processing circuit is further configured to receive the wakeup signal at the second frequency. In this way, the wakeup signal is monitored at a plurality of frequencies. This increases a probability of successfully capturing the wakeup signal, increases a probability of successfully waking up an electronic device, and reduces a wakeup delay. In addition, by performing monitoring at a plurality of frequencies, the wakeup signal can still be successfully captured when a temperature drift occurs. This effectively overcomes impact of the temperature drift.

For example, the wakeup apparatus may further include a third signal processing circuit. The third signal processing circuit is coupled to the antenna, and is configured to perform monitoring at the third frequency. After a temperature drift occurs, the third signal processing circuit is further configured to perform monitoring at a fourth frequency. The fourth frequency is different from all of the first frequency, the second frequency, and the third frequency. In this application, a plurality of signal processing circuits may be used to perform monitoring at a plurality of different frequencies. A larger quantity of signal processing circuits indicates a higher probability of successfully capturing the wakeup signal and a lower wakeup delay.

According to the second aspect, the first signal processing circuit is further configured to output a first logical value, where the first logical value is used to indicate that the first signal processing circuit receives the wakeup signal; the second signal processing circuit is further configured to output a second logical value, where the second logical value is used to indicate that the second signal processing circuit does not receive the wakeup signal; and the apparatus further includes a first logical OR operation circuit, where an input end of the first logical OR operation circuit is separately coupled to an output end of the first signal processing circuit and an output end of the second signal processing circuit, and the first logical OR operation circuit is configured to determine, based on the first logical value and the second logical value, that the wakeup signal is received. In this way, when either of the first signal processing circuit and the second signal processing circuit receives the wakeup signal, it can be determined that the wakeup signal is received. This improves receiving sensitivity.

According to the second aspect, the first signal processing circuit includes: an extremely narrow-band band-pass filter, where an input end of the extremely narrow-band band-pass filter is coupled to the antenna, and the extremely narrow-band band-pass filter is configured to perform extremely narrow-band band-pass filtering on a first signal detected at the second frequency, to obtain a filtered signal with an extremely narrow bandwidth; an envelope detector, where an input end of the envelope detector is coupled to an output end of the extremely narrow-band band-pass filter, and the envelope detector is configured to extract an amplitude envelope of the filtered signal to obtain a baseband pulse signal; a comparator, where an input end of the comparator is coupled to an output end of the envelope detector, and the comparator is configured to compare a voltage of the baseband pulse signal with a reference voltage to obtain a first digital signal sequence; and a correlator, where an input end of the correlator is coupled to an output end of the comparator, and the correlator is configured to: obtain a first correlation indicator value between the first digital signal sequence and a preset wakeup sequence, and compare the first correlation indicator value with a preset correlation threshold to obtain a correlation comparison result, where when the correlation comparison result indicates that the first correlation indicator value is greater than the correlation threshold, the first signal is a wakeup signal. In this way, by performing filtering at an extremely narrow bandwidth, more noise and interference can be filtered out, and therefore an anti-interference capability is improved.

According to the second aspect, the comparator includes: a first comparator, where an input end of the first comparator is coupled to the output end of the envelope detector, and the first comparator is configured to compare the voltage of the baseband pulse signal with a first reference voltage to obtain a first candidate digital signal sequence; and a second comparator, where an input end of the second comparator is coupled to the output end of the envelope detector, and the second comparator is configured to compare the voltage of the baseband pulse signal with a second reference voltage to obtain a second candidate digital signal sequence, where the second reference voltage is different from the first reference voltage; the correlator includes: a first correlator, where an input end of the first correlator is coupled to an output end of the first comparator, and the first correlator is configured to: obtain a first candidate value of a first correlation indicator value between the first candidate digital signal sequence and the preset wakeup sequence, and compare the first candidate value of the first correlation indicator value with the preset correlation threshold to obtain a first correlation comparison result; and a second correlator, where an input end of the second correlator is coupled to an output end of the second comparator, and the second correlator is configured to: obtain a second candidate value of a first correlation indicator value between the second candidate digital signal sequence and the preset wakeup sequence, and compare the second candidate value of the first correlation indicator value with the preset correlation threshold to obtain a second correlation comparison result; and the wakeup apparatus further includes a second logical OR operation circuit, where an input end of the second logical OR operation circuit is separately coupled to an output end of the first correlator and an output end of the second correlator, and the second logical OR operation circuit is configured to perform a logical OR operation on the first correlation comparison result and the second correlation comparison result to obtain a first logical OR operation result, where when the first logical OR operation result indicates that at least one of the first candidate value of the first correlation indicator value and the second candidate value of the first correlation indicator value is greater than the preset correlation threshold, the first signal is a wakeup signal. In this way, in each signal processing circuit, a plurality of comparators with different reference voltages are separately used to perform comparison with the voltage of the baseband pulse signal, and the different reference voltages correspond to different distances, so that when there is a different distance between two wireless electronic devices, at least one comparator can output an accurate wakeup sequence, to successfully wake up a primary transceiver in the electronic device, and improve sensitivity.

According to the second aspect, the first signal processing circuit includes: an extremely narrow-band band-pass filter, where an input end of the extremely narrow-band band-pass filter is coupled to the antenna, and the extremely narrow-band band-pass filter is configured to perform extremely narrow-band band-pass filtering on a first signal detected at the second frequency, to obtain a filtered signal with an extremely narrow bandwidth; an envelope detector, where an input end of the envelope detector is coupled to an output end of the extremely narrow-band band-pass filter, and the envelope detector is configured to detect an amplitude envelope of the filtered signal to obtain a baseband pulse signal; a comparator including an integrator circuit, where an input end of the comparator including the integrator circuit is coupled to an output end of the envelope detector, and the comparator including the integrator circuit is configured to: convert the baseband pulse signal into a single pulse signal, and compare a voltage of the single pulse signal with a reference voltage to obtain a second digital signal sequence; and a correlator, where an input end of the correlator is coupled to an output end of the comparator including the integrator circuit, and the correlator is configured to: obtain a second correlation indicator value between the second digital signal sequence and a preset wakeup sequence, and compare the second correlation indicator value with a preset correlation threshold to obtain a correlation comparison result, where when the correlation comparison result indicates that the second correlation indicator value is greater than the preset correlation threshold, the first signal is a wakeup signal. The integrator circuit can accumulate a voltage of the baseband pulse signal to form a corresponding single pulse signal. In this way, accuracy of a digital signal sequence output by the comparator can be improved, and overall sensitivity can be improved.

According to the second aspect, the comparator including the integrator circuit includes: a third comparator, where the third comparator includes an integrator circuit, an input end of the third comparator is coupled to the output end of the envelope detector, and the third comparator is configured to: convert the baseband pulse signal into a single pulse signal, and compare a voltage of the single pulse signal with a third reference voltage to obtain a third candidate digital signal sequence; and a fourth comparator, where the fourth comparator includes an integrator circuit, an input end of the fourth comparator is coupled to the output end of the envelope detector, and the fourth comparator is configured to: convert the baseband pulse signal into a single pulse signal, and compare a voltage of the single pulse signal with a fourth reference voltage to obtain a fourth candidate digital signal sequence, where the fourth reference voltage is different from the third reference voltage; the correlator includes: a third correlator, where an input end of the third correlator is coupled to an output end of the third comparator, and the third correlator is configured to: obtain a first candidate value of a second correlation indicator value between the third candidate digital signal sequence and the preset wakeup sequence, and compare the first candidate value of the second correlation indicator value with the preset correlation threshold to obtain a third correlation comparison result; and a fourth correlator, where an input end of the fourth correlator is coupled to an output end of the fourth comparator, and the fourth correlator is configured to: obtain a second candidate value of a second correlation indicator value between the fourth candidate digital signal sequence and the preset wakeup sequence, and compare the second candidate value of the second correlation indicator value with the preset correlation threshold to obtain a fourth correlation comparison result; and the wakeup apparatus further includes a second logical OR operation circuit, where an input end of the second logical OR operation circuit is separately coupled to an output end of the third correlator and an output end of the fourth correlator, and the second logical OR operation circuit is configured to perform a logical OR operation on the third correlation comparison result and the fourth correlation comparison result to obtain a second logical OR operation result, where when the second logical OR operation result indicates that at least one of the first candidate value of the second correlation indicator value and the second candidate value of the second correlation indicator value is greater than the preset correlation threshold, the first signal is a wakeup signal. In this way, in each signal processing circuit, a plurality of comparators with different reference voltages are separately used to perform comparison with the voltage of the baseband pulse signal, and the different reference voltages correspond to different distances, so that when there is a different distance between two wireless electronic devices, at least one comparator can output an accurate wakeup sequence, to successfully wake up a primary transceiver in the electronic device, and improve sensitivity.

According to the second aspect, the first frequency and the second frequency are adjacent frequencies. In this way, when a temperature drift occurs and the temperature drift is relatively small, a probability that the signal processing circuit receives the wakeup signal at the adjacent frequency is increased, thereby increasing a probability of successful wakeup.

According to the second aspect, the first frequency and the second frequency are non-adjacent frequencies. In this way, when a temperature drift occurs and the temperature drift is relatively large, a probability that the signal processing circuit receives the wakeup signal at the non-adjacent frequency is increased, thereby increasing a probability of successful wakeup.

According to the second aspect, the plurality of transmit frequencies include at least one of the first frequency and the second frequency. In this way, a probability of receiving the wakeup signal can be increased, thereby increasing a probability of successful wakeup.

According to the second aspect, at least one of the first frequency and the second frequency falls within the bandwidth at which the first electronic device transmits the wakeup signal. In this way, a probability of receiving the wakeup signal can be increased, thereby increasing a probability of successful wakeup.

According to a third aspect, this application provides an electronic device. The electronic device includes a memory and a processor. The memory is coupled to the processor. The memory stores program instructions, and when the program instructions are executed by the processor, the electronic device is enabled to perform the wakeup method in any one of the first aspect or the possible implementations of the first aspect.

According to a fourth aspect, this application provides a computer-readable storage medium. The computer-readable storage medium includes a computer program, and when the computer program is run on an electronic device, the electronic device is enabled to perform the wakeup method in any one of the first aspect or the possible implementations of the first aspect.

DETAILED DESCRIPTION OF ILLUSTRATIVE EMBODIMENTS

The following clearly and completely describes the technical solutions in embodiments of this application with reference to the accompanying drawings in embodiments of this application. Apparently, the described embodiments are some rather than all of the embodiments of this application. All other embodiments obtained by a person of ordinary skill in the art based on the embodiments of this application without creative efforts shall fall within the protection scope of this application.

In this specification, the term "and/or" is merely used to describe an association relationship between associated objects, and indicates that three relationships may exist. For example, A and/or B may indicate the following three cases: Only A exists, both A and B exist, and only B exists.

The terms "first", "second", and the like in this specification and claims of the embodiments of this application are used to distinguish between different objects, and are not used to describe a specific sequence of the objects. For example, a first target object, a second target object, and the like are used to distinguish between different target objects, but are not used to describe a specific sequence of the target objects.

In the embodiments of this application, words such as "an example" or "for example" are used to represent giving an example, an illustration, or a description. Any embodiment or design solution described as "an example" or "for example" in the embodiments of this application should not be construed as being more preferred or advantageous than other embodiments or design solutions. Exactly, use of the words such as "an example" or "for example" is intended to present a related concept in a specific manner.

In the description of the embodiments of this application, unless otherwise stated, "a plurality of" means two or more. For example, "a plurality of processing units" means two or more processing units, and "a plurality of systems" means two or more systems.

The wakeup method in the embodiments of this application may be applied to a wakeup scenario between a first electronic device and one or more second electronic devices. The first electronic device may be, for example, an electronic device such as a mobile phone, a tablet computer, a smartwatch, a Wi-Fi router, a sensor network information collection apparatus, a central node, an unmanned aerial vehicle, or a base station (Base Station). The second electronic device may be, for example, an electronic device such as a mobile phone, a tablet computer, a Wi-Fi router, an electronic label, a wireless headset, a smart meter, or a smartwatch.

Figure 1:
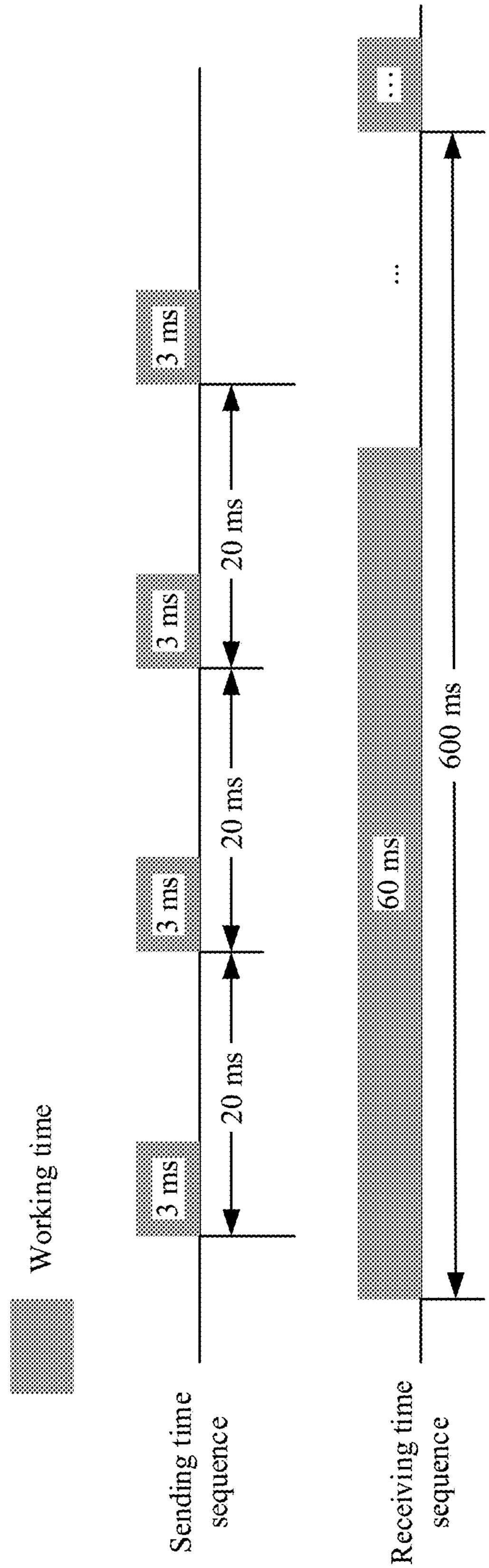
FIG. 1 is an example schematic diagram of a sending time sequence and a receiving time sequence of a low duty cycle solution.

In a related technology, standby power consumption of an electronic device may be reduced by reducing a duty cycle of a receiver in the electronic device. In the related technology, the receiver periodically switches between a working state and a sleeping state. The duty cycle is defined as a proportion of a working time in a total time. FIG. 1 is an example schematic diagram of a sending time sequence and a receiving time sequence of a low duty cycle solution. Referring to FIG. 1, a transmitter transmits a signal every 20 ms (millisecond), and working duration of the transmitter in each period (20 ms) is 3 ms; and a receiver starts every 600 ms, working duration for each time is 60 ms, and a duty cycle is 60/600=0.1. A minimum delay of the receiver is 3 ms, but a maximum delay may reach 543 ms.

It can be learned that standby power consumption of the receiver can be effectively reduced by reducing the duty cycle, but a probability of waking up the receiver is reduced, and a wakeup delay is increased.

Figure 2:
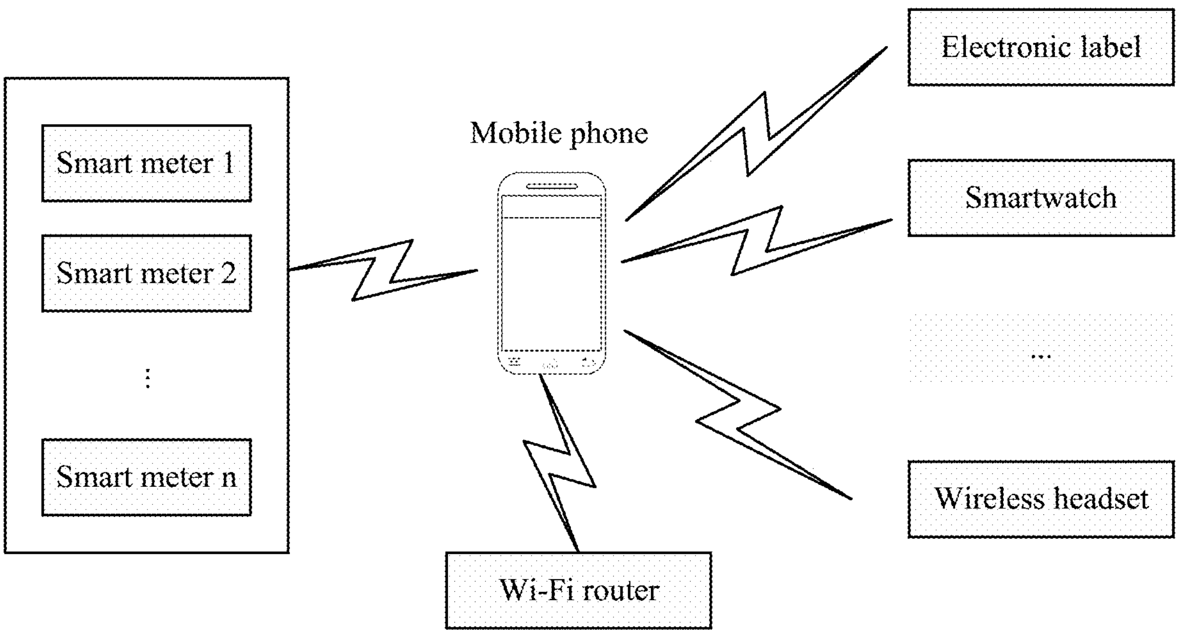
FIG. 2 is an example schematic diagram of an application scenario of a wakeup method.

FIG. 2 is an example schematic diagram of an application scenario of a wakeup method. Referring to FIG. 2, before a connection is established between a mobile phone and an electronic label, a smartwatch, a wireless headset, a Wi-Fi router, or a group of smart meters, the wakeup method in the embodiments of this application may be applied to wake up the electronic label, the smartwatch, the wireless headset, the Wi-Fi router, or the group of smart meters. After the electronic label, the smartwatch, the wireless headset, the Wi-Fi router, or the group of smart meters is woken up, the mobile phone may establish a connection based on a communication protocol such as a Wi-Fi protocol, a Bluetooth (Blue Tooth, BT) protocol, a device-to-device (Device-to-Device, D2D) protocol, or a cellular mobile communication protocol to the electronic label, the smartwatch, the wireless headset, the Wi-Fi router, or the group of smart meters, to perform data communication.

It should be noted that a type, a quantity, and the like of electronic devices in the application scenario shown in FIG. 1 are merely examples. This is not limited in this application.

In the embodiments of this application, the wakeup method is applied to a wakeup system that includes a first electronic device and a second electronic device. The first electronic device is a wakeup device, and the second electronic device is a device to be woken up. A primary transceiver in the second electronic device is configured to perform data communication with the first electronic device. However, the primary transceiver usually consumes relatively high power. In a standby process of the second electronic device, if the primary transceiver is kept steadily on, standby power consumption of the second electronic device is greatly increased. To reduce the standby power consumption of the second electronic device, the embodiments of this application provide a new receiver architecture for the second electronic device. Based on this, the wakeup method in the embodiments of this application is provided.

With reference to the accompanying drawings, the following describes a receiver architecture corresponding to the wakeup method in the embodiments of this application and a principle of the wakeup method.

Figure 3:
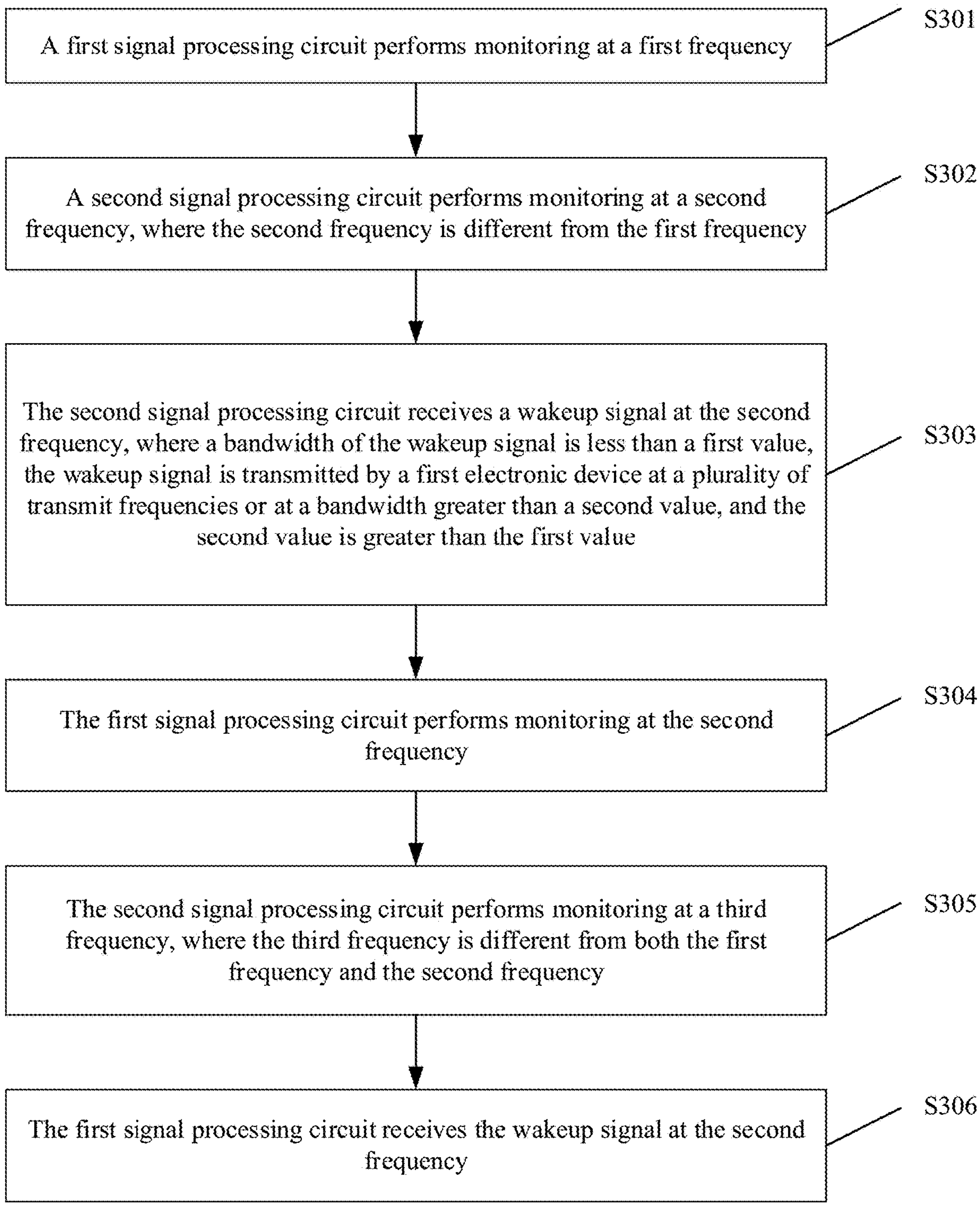
FIG. 3 is an example flowchart of a wakeup method.

FIG. 3 is an example flowchart of a wakeup method. The wakeup method may be performed by a wakeup receiver 220 in the following FIG. 4. Referring to FIG. 3, in this embodiment of this application, the wakeup method may include the following steps.

Step S301: A first signal processing circuit performs monitoring at a first frequency.

Step S302: A second signal processing circuit performs monitoring at a second frequency, where the second frequency is different from the first frequency.

Step S303: The second signal processing circuit receives a wakeup signal at the second frequency, where a bandwidth of the wakeup signal is less than a first value, the wakeup signal is transmitted by a first electronic device at a plurality of transmit frequencies or at a bandwidth greater than a second value, and the second value is greater than the first value.

Step S304: The first signal processing circuit performs monitoring at the second frequency.

Step S305: The second signal processing circuit performs monitoring at a third frequency, where the third frequency is different from both the first frequency and the second frequency.

Step S306: The first signal processing circuit receives the wakeup signal at the second frequency.

Both the first signal processing circuit and the second signal processing circuit are circuits in the wakeup receiver in the following FIG. 4.

The following further describes the wakeup method in the embodiments of this application in detail with reference to internal structures of a receiver and the wakeup receiver.

Figure 4:
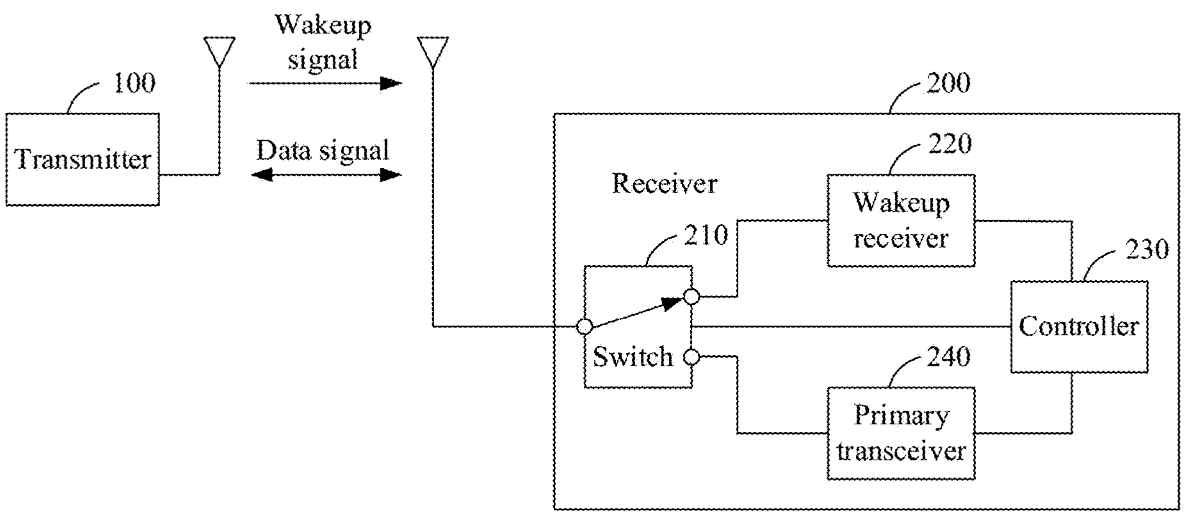
FIG. 4 is an example schematic diagram of structures of a transmitter and a receiver.

FIG. 4 is an example schematic diagram of structures of a transmitter and a receiver. Referring to FIG. 4, in this embodiment of this application, a first electronic device includes a transmitter 100 in FIG. 4, and a second electronic device includes a receiver 200 in FIG. 4. The transmitter 100 may be compatible with a transmitter in an existing communication system such as a cellular communication system, a Wi-Fi communication system, or a Bluetooth communication system, and perform data communication with a primary transceiver based on a conventional protocol.

Still referring to FIG. 4, the receiver 200 may include a switch 210, the wakeup receiver 220, a controller 230, and a primary transceiver 240. The switch 210 is separately coupled to an antenna in the receiver, the wakeup receiver 220, the controller 230, and the primary transceiver 240. The wakeup receiver 220 is separately coupled to the switch 210 and the controller 230. The controller 230 is separately coupled to the wakeup receiver 220 and the primary transceiver 240. The primary transceiver 240 is separately coupled to the switch 210 and the controller 230. In an example, the receiver 200 may include one wakeup receiver 220. In another example, the receiver 200 may include a group of wakeup receivers 220.

The antenna in the receiver 200 (which is referred to as a receive antenna below for ease of description) receives a radio frequency signal transmitted by an antenna in the transmitter 100 (which is referred to as a transmit antenna below for ease of description). The radio frequency signal includes a wakeup signal and a data signal. The wakeup signal is used to wake up the primary transceiver 240 in the receiver 200, that is, switch the primary transceiver 240 from a sleeping state to a working state. The data signal is used by the first electronic device to perform data communication with the second electronic device.

A working principle of the receiver 200 shown in FIG. 4 is as follows: In a standby process of the second electronic device in which the receiver 200 is located, the primary transceiver 240 is in the sleeping state, and the wakeup receiver 220 is in a working state. If the wakeup receiver 220 receives the wakeup signal transmitted by the transmitter 100 in the first electronic device, the wakeup receiver 220 sends a signal for indicating to wake up the primary transceiver 240 to the controller 230, and then the wakeup receiver 220 enters a sleeping state. After receiving the signal for indicating to wake up the primary transceiver 240, the controller 230 may control the primary transceiver 240 to switch from the sleeping state to the working state.

In another example, after receiving the signal for indicating to wake up the primary transceiver 240, the controller 230 may control the primary transceiver 240 to continue to remain in the sleeping state. Alternatively, after receiving the signal for indicating to wake up the primary transceiver 240, the controller 230 may control the primary transceiver 240 to switch from the sleeping state to the working state after a delay of a period of time.

On the premise of compliance with the working principle, different coupling relationships may be used between components (the switch 210, the wakeup receiver 220, the controller 230, and the primary transceiver 240) in the receiver 200 shown in FIG. 4. A coupling relationship between the components in the receiver 200 shown in FIG. 4 is not limited in this embodiment of this application.

A working process of the receiver 200 may vary with a coupling relationship used by the receiver 200. However, a working principle of the receiver 200 is the same as the foregoing working principle.

The following provides a working process of the receiver 200 based on an example coupling relationship between the components in the receiver 200.

In an example, in FIG. 4, the switch 210 may include two input ends and two output ends. One input end (which is referred to as a first input end in this specification for ease of description) of the switch 210 is coupled to the antenna in the receiver, and the other input end (which is referred to as a second input end in this specification for ease of description) is coupled to the controller 230. One output end (which is referred to as a first output end in this specification for ease of description) of the switch 210 is coupled to the wakeup receiver 220, and the other output end (which is referred to as a second output end in this specification for ease of description) is coupled to the primary transceiver 240. The switch 210 couples the first input end to the first output end or couples the first input end to the second output end under the action of a control signal from the controller 230.

In an example, in FIG. 4, the wakeup receiver 220 may include two input ends and one output end. The wakeup receiver 220 is separately connected to the switch 210 and the controller 230. When the wakeup receiver 220 is in the working state, one input end of the wakeup receiver 220 (which is referred to as a first input end of the wakeup receiver 220 in this specification for ease of description) is coupled to the switch 210, and the output end of the wakeup receiver 220 is coupled to the controller 230. When the wakeup receiver 220 is in the sleeping state, the other input end of the wakeup receiver 220 (which is referred to as a second input end of the wakeup receiver 220 in this specification for ease of description) is coupled to the controller 230.

In an example, in FIG. 4, the controller 230 may include two input ends and three output ends. One input end of the controller 230 (which is referred to as a first input end of the controller 230 in this specification for ease of description) is coupled to the wakeup receiver 220, and the other input end (which is referred to as a second input end of the controller 230 in this specification for ease of description) is coupled to the primary transceiver 240. One output end of the controller 230 (which is referred to as a first output end of the controller 230 in this specification for ease of description) is coupled to the switch 210, one output end (which is referred to as a second output end of the controller 230 in this specification for ease of description) is coupled to the primary transceiver 240, and the other output end (which is referred to as a third output end of the controller 230 in this specification for ease of description) is coupled to the wakeup receiver 220.

In an example, in FIG. 4, the primary transceiver 240 may include two input ends and two output ends. One input end of the primary transceiver 240 (which is referred to as a first input end of the primary transceiver 240 in this specification for ease of description) is coupled to the switch 210, and the other input end (which is referred to as a second input end of the primary transceiver 240 in this specification for ease of description) is coupled to the controller 230. One output end of the primary transceiver 240 (which is referred to as a first output end of the primary transceiver 240 in this specification for ease of description) is coupled to the switch 210, and the other output end (which is referred to as a second output end of the primary transceiver 240 in this specification for ease of description) is coupled to the controller 230.

When the receiver 200 uses the foregoing coupling relationship, a working process of the receiver 200 may be as follows:

When the second electronic device is in a standby state, the first input end of the switch 210 is coupled to the first output end of the switch 210, and the first input end of the switch 210 remains in a state of being disconnected from the second output end of the switch 210. In this case, the wakeup receiver 220 is in the working state, and the primary transceiver 240 is in the sleeping state.

In the standby state, when a preset wakeup trigger condition is met, the transmitter 100 transmits the wakeup signal by using the transmit antenna. After receiving, by using the first input end of the wakeup receiver 220, the wakeup signal transmitted by the transmitter 100, the wakeup receiver 220 generates a signal for indicating to wake up the primary transceiver 240, and sends, to the controller 230 by using the output end, the signal for indicating to wake up the primary transceiver 240. In addition, the wakeup receiver 220 switches from the working state to the sleeping state.

The controller 230 receives, by using the first input end of the controller 230, the signal sent by the wakeup receiver 220 for indicating to wake up the primary transceiver 240, generates first control information for indicating the switch 210 to point to the primary transceiver 240, generates second control information for indicating the primary transceiver 240 to switch to the working state, sends the first control information to the switch 210 by using the first output end of the controller 230, and sends the second control information to the primary transceiver 240 by using the second output end of the controller 230.

The switch 210 receives, by using the second input end of the switch 210, the first control information sent by the controller 230, and switches, based on the first control information, the first input end of the switch 210 to being coupled to the second output end of the switch 210. In this case, the first input end of the switch 210 and the first output end of the switch 210 are switched to a decoupled state, and the first input end of the primary transceiver 240 is coupled to the antenna in the receiver by using the second output end of the switch 210 and the first input end of the switch 210.

After receiving the second control information by using the second input end of the primary transceiver 240, the primary transceiver 240 switches from the sleeping state to the working state. So far, a wakeup process is completed.

After switching from the sleeping state to the working state, the primary transceiver 240 may send a wakeup success notification to the transmitter 100 by using the first output end. When receiving the wakeup success notification, the transmitter 100 may stop sending the wakeup signal.

Then, the transmitter 100 establishes a communication connection to the primary transceiver 240 in the receiver 200 based on a communication protocol such as a Bluetooth protocol, a Wi-Fi protocol, or a D2D protocol. After successfully establishing the communication connection, the transmitter 100 transmits the data signal to the receiver 200 by using the transmit antenna. The primary transceiver 240 in the receiver 200 receives the data signal, performs corresponding processing, and performs data communication with the transmitter 100.

When duration in which the primary transceiver 240 does not receive the data signal reaches a preset time threshold, the primary transceiver 240 may send sleep notification information to the controller 230 by using the second output end, and then switch from the working state to the sleeping state. The second electronic device in which the primary transceiver 240 is located enters the standby state.

The controller 230 receives, by using the second input end of the controller 230, the sleep notification information sent by the primary transceiver 240, generates third control information for indicating the switch 210 to point to the wakeup receiver 220, generates fourth control information for indicating the wakeup receiver 220 to switch to the working state, sends the third control information to the switch 210 by using the first output end of the controller 230, and sends the fourth control information to the wakeup receiver 220 by using the third output end of the controller 230.

The wakeup receiver 220 receives the fourth control information by using the second input end of the wakeup receiver 220, and switches from the sleeping state to the working state based on an indication of the fourth control information. The receive antenna performs sensing and scanning until the wakeup signal transmitted by the transmitter 100 is received again, and next wakeup is performed.

It should be noted that the working process of the receiver 200 is merely an example used to describe the working principle of the receiver 200, and is not used to limit the working process of the receiver 200. A person skilled in the art may understand that with reference to an actual application scenario, in another embodiment of this application, the receiver 200 may use another coupling relationship different from the coupling relationship in the foregoing example, and the receiver 200 may use another working process different from the working process in the foregoing example based on the another coupling relationship.

For example, on the basis of the coupling relationship in the foregoing example, the second output end of the controller 230 may be removed. On the basis of the new coupling relationship, when receiving, by using the first input end of the controller 230, the signal sent by the wakeup receiver 220 for indicating to wake up the primary transceiver 240, the controller 230 generates the first control information for indicating to switch the first input end of the switch 210 to being coupled to the second output end of the switch 210, with no need to generate the second control information for indicating the primary transceiver 240 to switch to the working state, and sends the first control information to the switch 210 by using the first output end of the controller 230.

The switch 210 receives, by using the second input end of the switch 210, the first control information sent by the controller 230, and switches, based on the first control information, the first input end of the switch 210 to being coupled to the second output end of the switch 210. In this case, the first input end of the switch 210 and the first output end of the switch 210 are switched to a decoupled state, and the first input end of the primary transceiver 240 is coupled to the receive antenna by using the second output end of the switch 210 and the first input end of the switch 210.

In response to detecting that the first input end of the primary transceiver 240 is coupled to the receive antenna by using the second output end of the switch 210 and the first input end of the switch 210, the primary transceiver 240 switches from the sleeping state to the working state.

In this embodiment of this application, the wakeup trigger condition may be set based on an actual application requirement. In an example, the wakeup trigger condition may be as follows: The first electronic device in which the transmitter 100 is located receives communication data that needs to be forwarded to the second electronic device in which the receiver 200 is located. The communication data may be, for example, voice information or video information. In another example, the wakeup trigger condition may be as follows: The first electronic device in which the transmitter 100 is located generates a wakeup start instruction in response to a trigger operation performed by a user. It should be noted that the two wakeup trigger conditions are merely examples. The wakeup trigger condition is not limited in this embodiment of this application.

In this embodiment of this application, the primary transceiver 240 may be a module shared by a plurality of communication protocols such as a cellular protocol, a Wi-Fi protocol, and a Bluetooth protocol, and the primary transceiver 240 can perform data communication with the transmitter 100 by using protocols such as the cellular protocol, the Wi-Fi protocol, and the Bluetooth protocol.

In an architecture of the receiver 200 shown in FIG. 4, a microcontroller unit (Microcontroller Unit, MCU) may be used as the controller 230.

It should be noted that in an example, an electronic device may be used only as the first electronic device. For example, in a wakeup system that includes a base station and a mobile phone, the base station is the first electronic device, and the base station includes the transmitter 100 shown in FIG. 4, but does not include the receiver 200 shown in FIG. 4.

In another example, an electronic device may be used only as the second electronic device. For example, in a wakeup system that includes a mobile phone and an electronic label, the electronic label is the second electronic device, and the electronic label includes the receiver 200 shown in FIG. 4, but does not include the transmitter 100 shown in FIG. 4.

In still another example, an electronic device may be used as both the first electronic device and the second electronic device. In this case, the electronic device corresponds to two wakeup systems, for example, a mobile phone. In a wakeup system that includes a mobile phone and an electronic label, the mobile phone is the first electronic device. In a wakeup system that includes a base station and a mobile phone, the mobile phone is the second electronic device. In this case, the mobile phone includes both a receiver 200 corresponding to a transmitter 100 in the base station and a transmitter 100 corresponding to a receiver 200 in the electronic label.

It should be noted that a communication distance between the first electronic device and the second electronic device in the wakeup system in a wakeup process is not limited in this embodiment of this application.

The following describes a structure of the wakeup receiver 220 in detail with reference to the accompanying drawings.

Figure 5:
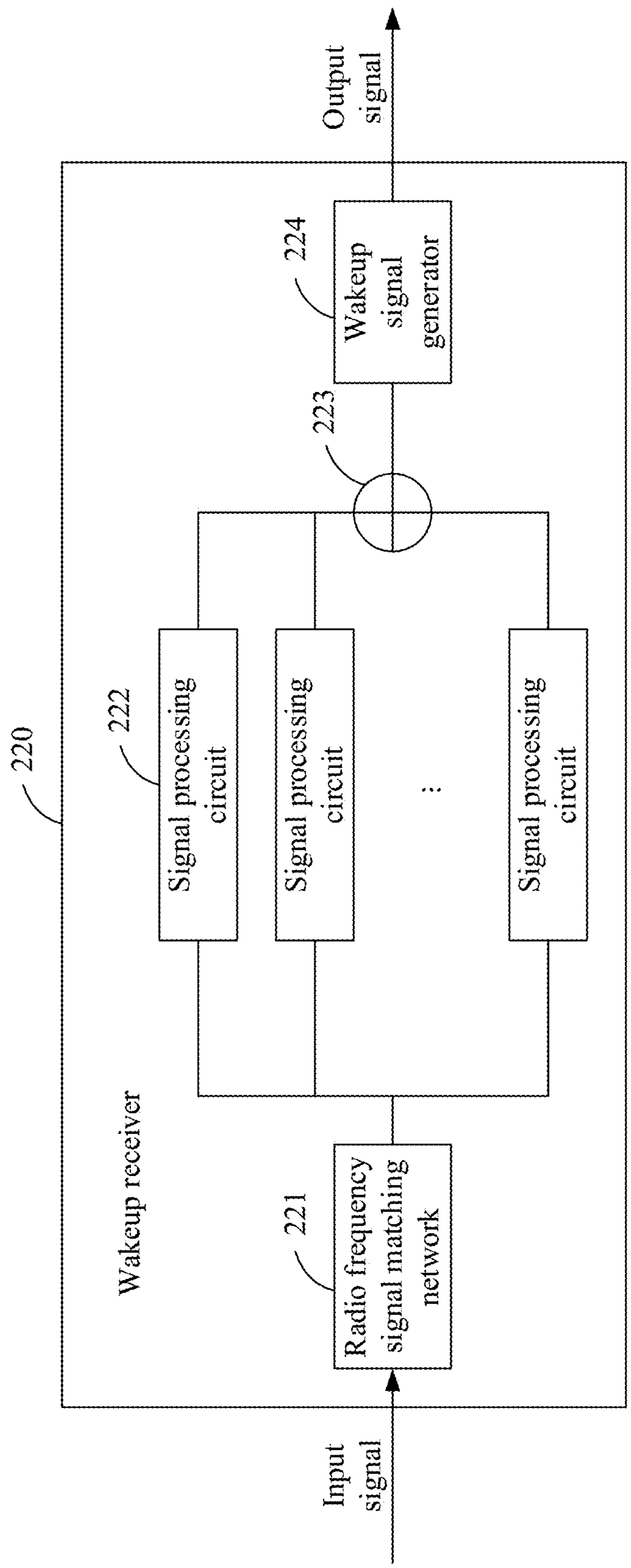
FIG. 5 is an example schematic diagram of a structure of a wakeup receiver 220 in FIG. 4.

FIG. 5 is an example schematic diagram of a structure of a wakeup receiver 220 in FIG. 4. Referring to FIG. 5, the wakeup receiver 220 may include a radio frequency signal matching network 221, a plurality of signal processing circuits 222 connected in parallel, a logical OR operation circuit 223, and a wakeup signal generator 224. An input end of the radio frequency signal matching network 221 is coupled to the antenna in the receiver, an output end of the radio frequency signal matching network 221 is separately coupled to an input end of each signal processing circuit, the input end of each signal processing circuit is coupled to an input end of the logical OR operation circuit 223, and an output end of the logical OR operation circuit 223 is coupled to the wakeup signal generator 224.

The radio frequency signal matching network 221 is configured to implement impedance matching between the wakeup receiver 220 and the antenna in the receiver. The signal processing circuit 222 is configured to: process an input signal (in this specification, the input signal is a transmitted signal received by the receive antenna from the transmitter 100 in the first electronic device), determine whether the input signal includes a signal whose correlation with a locally stored wakeup sequence is greater than a preset correlation threshold, and if the input signal includes a signal whose correlation with the locally stored wakeup sequence is greater than the preset correlation threshold, determine that the wakeup signal is received. When a correlation between a wakeup sequence included in the input signal and the locally stored wakeup sequence is greater than the preset correlation threshold, the signal processing circuit 222 outputs a signal (for example, a digital signal 1 or a high-level signal) indicating that the wakeup signal is received. Otherwise, the signal processing circuit 222 outputs a signal (for example, a digital signal 0 or a low-level signal) indicating that the wakeup signal is not received. The logical OR operation circuit 223 is configured to perform a logical OR operation on high-level signals, low-level signals, or digital signals output by the plurality of signal processing circuits 222 connected in parallel. If a logical OR operation result of the logical OR operation circuit 223 is 1, a signal (for example, a digital signal 1 or a high-level signal) indicating that the wakeup signal is received is output to the wakeup signal generator 224. If a logical OR operation result is 0, a signal (for example, a digital signal 0 or a low-level signal) indicating that the wakeup signal is not received is output to the wakeup signal generator 224. When receiving the signal that indicates that the wakeup signal is received and that is sent by the logical OR operation circuit 223, the wakeup signal generator 224 generates a signal for indicating to wake up the primary transceiver 240, and sends the signal for indicating to wake up the primary transceiver 240 to the controller 230. After receiving the signal for indicating to wake up the primary transceiver 240, the controller 230 generates first control information for indicating the switch 210 to point to the primary transceiver 240, generates second control information for indicating the primary transceiver 240 to switch to the working state, sends the first control information to the switch 210 by using the first output end of the controller 230, and sends the second control information to the primary transceiver 240 by using the second output end of the controller 230. When the wakeup signal generator 224 receives the signal that indicates that the wakeup signal is not received and that is sent by the logical OR operation circuit 223, the wakeup signal generator 224 remains in an original state.

Operating frequencies of the plurality of signal processing circuits 222 are different, and all the signal processing circuits 222 receive the wakeup signal at the respective operating frequencies.

Figure 6:
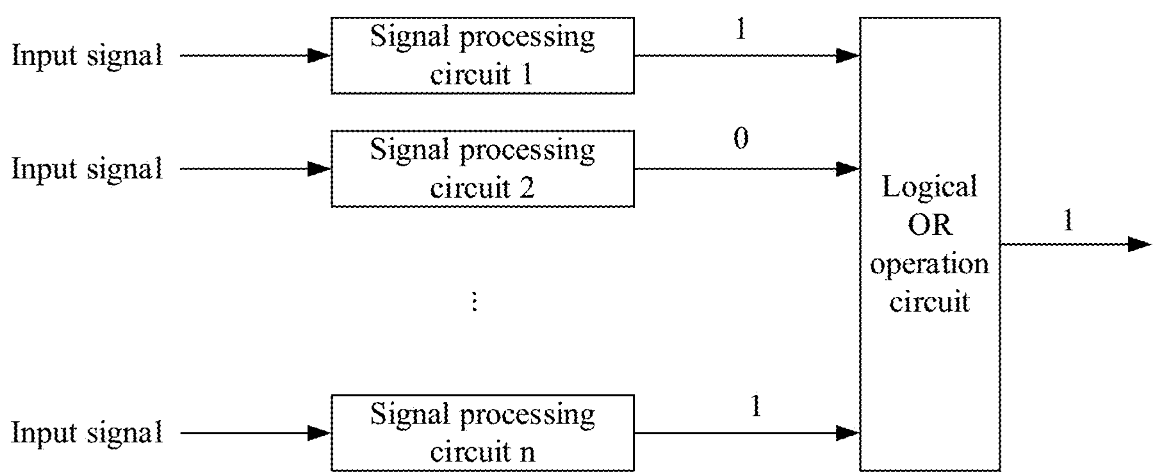
FIG. 6 is an example schematic diagram of a signal transmission relationship between a signal processing circuit 222 and a logical OR operation circuit 223 in FIG. 5.

FIG. 6 is an example schematic diagram of a signal transmission relationship between a signal processing circuit 222 and a logical OR operation circuit 223 in FIG. 5. In this embodiment of this application, it is assumed that the signal indicating that the wakeup signal is received is the digital signal 1, and the signal indicating that the wakeup signal is not received is the digital signal 0. Referring to FIG. 6, it is assumed that there are a total of n signal processing circuits: a signal processing circuit 1, a signal processing circuit 2, . . . , and a signal processing circuit n. Each signal processing circuit separately processes an input signal. After processing the input signal, the signal processing circuit 1 outputs 1, after processing the input signal, the signal processing circuit 2 outputs 0, . . . , and after processing the input signal, the signal processing circuit n outputs 1. The logical OR operation circuit performs a logical OR operation on the digital signals output by the n signal processing circuits, and outputs an operation result 1. In this way, provided that at least one signal processing circuit outputs 1 after processing the input signal, the operation result output by the logical OR operation circuit is 1, and the digital signal 1 is used to subsequently trigger the controller 230 to wake up the primary transceiver 240. When all the signal processing circuits in the wakeup receiver 220 output 0, an operation result output by the logical OR operation circuit is 0, and the digital signal 0 is not used to trigger wakeup of the primary transceiver 240.

It can be learned that in this embodiment of this application, a probability that the wakeup receiver 220 successfully captures the wakeup signal is increased by using the plurality of signal processing circuits connected in parallel. This increases a probability of successfully waking up the transceiver 240, and reduces a wakeup delay.

It should be noted that in another embodiment of this application, the wakeup receiver 220 may include only one signal processing circuit 222. In this case, the wakeup receiver 220 does not include the logical OR operation circuit 223, and a signal output by the signal processing circuit 222 is directly transmitted to the wakeup signal generator 224. In this way, a structure of the wakeup receiver 220 can be simplified, to reduce hardware costs and reduce power consumption.

Figure 7:
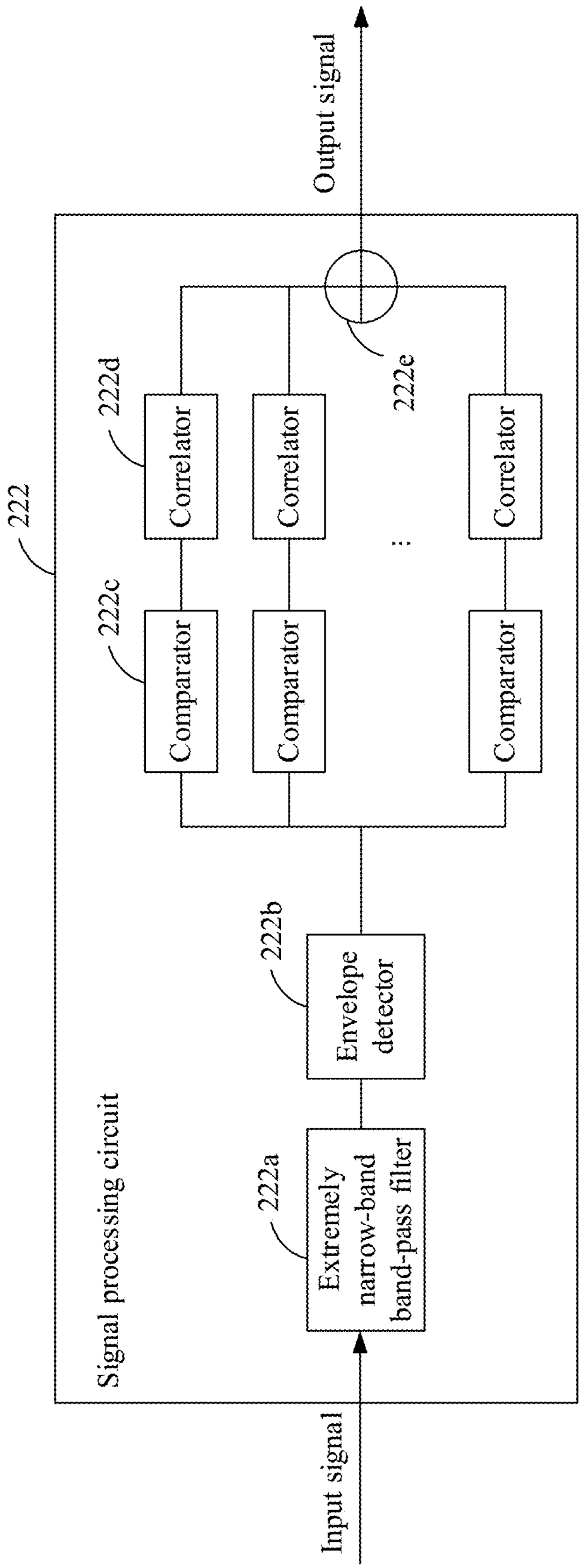
FIG. 7 is an example schematic diagram of a structure of a signal processing circuit 222 in FIG. 5.

FIG. 7 is an example schematic diagram of a structure of a signal processing circuit 222 in FIG. 5. Referring to FIG. 7, the signal processing circuit 222 may include an extremely narrow-band band-pass filter 222a, an envelope detector 222b, a plurality of comparators 222c connected in parallel, a plurality of correlators 222d connected in parallel, and a logical OR operation circuit 222e. An input end of the extremely narrow-band band-pass filter 222a is coupled to the output end of the radio frequency signal matching network 221, an output end of the extremely narrow-band band-pass filter 222a is coupled to an input end of the envelope detector 222b, an output end of the envelope detector 222b is separately coupled to an input end of each comparator 222c, an output end of the comparator 222c is coupled to an input end of the correlator 222d, an output end of the correlator 222d is coupled to an input end of the logical OR operation circuit 222e, and an output end of the logical OR operation circuit 222e is coupled to the input end of the logical OR operation circuit 223 shown in FIG. 5.

The extremely narrow-band band-pass filter 222a is configured to filter the input signal to obtain a filtered signal with an extremely narrow bandwidth. The extremely narrow-band band-pass filter 222a has an extremely high carrier frequency-to-bandwidth ratio, can effectively filter out out-of-band noise and interference, and significantly improve an anti-interference capability of the wakeup receiver 220.

The envelope detector 222b is configured to extract an amplitude envelope of the filtered signal output by the extremely narrow-band band-pass filter 222a to obtain a baseband pulse signal.

In the parallel circuits, the comparator 222c and the correlator 222d in each circuit are connected in series. The comparator 222c is configured to: compare a voltage of the baseband pulse signal output by the envelope detector 222b with a reference voltage, and output a 0/1 level sequence. When the voltage of the baseband pulse signal is greater than or equal to the reference voltage, the comparator 222c outputs 1. When the voltage of the baseband pulse signal is less than the reference voltage, the comparator 222c outputs 0.

In an example, the comparator 222c may include an integrator circuit. The integrator circuit is configured to: convert the input baseband pulse signal into a single pulse signal, and compare a voltage of the single pulse signal with the reference voltage.

In this embodiment of this application, different comparators 222c use different reference voltage values, and the different reference voltage values are adapted to different distances between the first electronic device and the second electronic device, so that when there is a different distance between the first electronic device and the second electronic device, at least one comparator 222c can output an accurate 0/1 level sequence, to improve sensitivity of the wakeup receiver.

When transmit power of the transmitter 100 is fixed, a longer distance between the first electronic device and the second electronic device indicates a weaker input signal received by the wakeup receiver 220. Correspondingly, the voltage of the baseband pulse signal or the single pulse signal converted from the baseband pulse signal is lower. In this case, a lower reference voltage is required. On the contrary, a shorter distance between the first electronic device and the second electronic device indicates a stronger input signal received by the wakeup receiver 220. Correspondingly, the voltage of the baseband pulse signal or the single pulse signal converted from the baseband pulse signal is higher. In this case, a higher reference voltage is required.

Table 1 is a table of a correspondence between the distance d between the first electronic device and the second electronic device and the reference voltage value V.

TABLE 1

| Distance d between the first electronic device and the second electronic device | Reference voltage value V |
|---|---|
| d1 | V1 |
| d2 | V2 |
| d3 | V3 |
| . . . | . . . |

In Table 1, $d1<d2<d3$. Correspondingly, $V1>V2>V3$. When the distance between the first electronic device and the second electronic device is $d\leq d1$, the 0/1 level sequence can be obtained by using a comparator that uses the reference voltage value $V=V1$; when the distance between the first electronic device and the second electronic device is $d1\leq d\leq d2$, the 0/1 level sequence can be obtained by using a comparator that uses the reference voltage value $V=V2$; when the distance between the first electronic device and the second electronic device is $d2\leq d\leq d3$, the 0/1 level sequence can be obtained by using a comparator that uses the reference voltage value $V=V3$; and so on.

The correlator 222*d* is configured to obtain a correlation indicator value between the 0/1 level sequence output by the comparator 222*c* and a wakeup sequence (namely, a preset wakeup sequence) currently locally stored in the device. If the correlation indicator value between the two sequences is greater than the preset correlation threshold, the correlator 222*d* outputs a signal (for example, a digital signal 1 or a high-level signal) indicating that the wakeup signal is received. Otherwise, the correlator 222*d* outputs a signal (for example, a digital signal 0 or a low-level signal) indicating that the wakeup signal is not received.

The logical OR operation circuit 222*e* is configured to perform a logical OR operation on high-level signals, low-level signals, or digital signals output by the plurality of comparators 222*c* connected in parallel and the plurality of correlators 222*d* connected in parallel. It is assumed that the signal indicating that the wakeup signal is received is the digital signal 1, and the signal indicating that the wakeup signal is not received is the digital signal 0. The logical OR operation circuit 222*e* outputs a logical OR operation result to the logical OR operation circuit 223.

Figure 8:
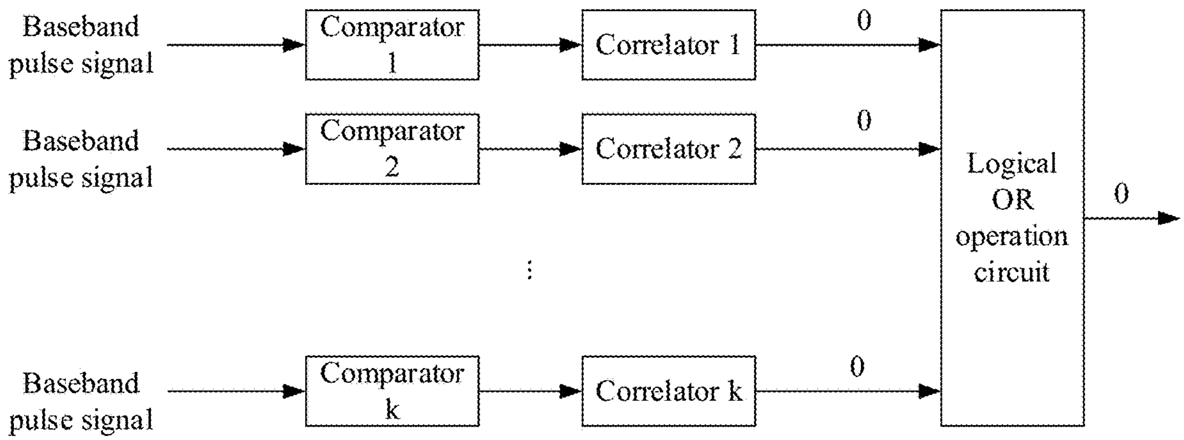
FIG. 8 is an example schematic diagram of a signal transmission relationship between a comparator and a correlator.

FIG. 8 is an example schematic diagram of a signal transmission relationship between a comparator and a correlator. Referring to FIG. 8, it is assumed that each signal processing circuit includes k comparators and correlators: a comparator 1 and a correlator 1, a comparator 2 and a correlator 2, . . . , and a comparator k and a correlator k. A same baseband pulse signal is input to each comparator and correlator. The comparator 1 and the correlator 1 output the digital signal 0 after processing the baseband pulse signal, the comparator 2 and the correlator 2 output the digital signal 0 after processing the baseband pulse signal, . . . , and the comparator k and the correlator k output the digital signal 0 after processing the baseband pulse signal. That is, all the correlators output the digital signal 0, the logical OR operation circuit 222*e* outputs the digital signal 0, and the output of the logical OR operation circuit 222*e* is an output of a corresponding signal processing circuit. If at least one of the k comparators and correlators outputs the digital signal 1, a corresponding signal processing circuit outputs the digital signal 1, and therefore the primary transceiver 240 can be woken up.

It can be learned that in this embodiment of this application, a plurality of comparators that are connected in parallel and that use different reference voltages and corresponding correlators are used. This improves sensitivity of the wakeup receiver 220 and helps reduce a wakeup delay.

It should be noted that in another embodiment of this application, each signal processing circuit 222 may include only one comparator 222*c* and one correlator 222*d*. In this case, the signal processing circuit 222 does not include the logical OR operation circuit 222*e*. The correlator 222*d* directly outputs the digital signal to the logical OR operation circuit 223 (in this case, the wakeup receiver 220 includes a plurality of signal processing circuits 222), or outputs the digital signal to the wakeup signal generator 224 (in this case, the wakeup receiver 220 includes only one signal processing circuit 222). In this way, a structure of the signal processing circuit 222 can be simplified, to reduce hardware costs and reduce power consumption.

With reference to the descriptions of the circuit structures in FIG. 4, FIG. 5, and FIG. 7, the following further describes a mechanism for transmitting and receiving the wakeup signal in the embodiment shown in FIG. 4.

In this embodiment of this application, a bandwidth of the extremely narrow-band band-pass filter 222*a* is very small. For example, the bandwidth of the extremely narrow-band band-pass filter 222*a* may be less than 1 MHz. An anti-interference capability of the wakeup receiver 220 may be significantly improved by using the extremely narrow-band band-pass filter 222*a* with a very small bandwidth. However, the extremely narrow-band band-pass filter 222*a* has a temperature drift. For example, the temperature drift of the extremely narrow-band band-pass filter 222*a* is a temperature drift of the signal processing circuit 222 in which the extremely narrow-band band-pass filter 222*a* is located. It is assumed that an operating frequency of the designed extremely narrow-band band-pass filter 222*a* is f. When the extremely narrow-band band-pass filter 222*a* actually works, an actual operating frequency is f, where f and f are different frequencies.

For a temperature drift problem, this embodiment of this application provides a corresponding manner of transmitting the wakeup signal.

For example, the transmitter 100 shown in FIG. 4 may transmit the wakeup signal in the following manner.

A first manner of transmitting the wakeup signal is a multi-frequency transmission manner. In this manner, the transmitter 100 transmits a wakeup signal with a narrow bandwidth at a plurality of frequencies. The bandwidth of the wakeup signal may be set based on an application requirement, for example, less than 1 MHz.

Figure 9:
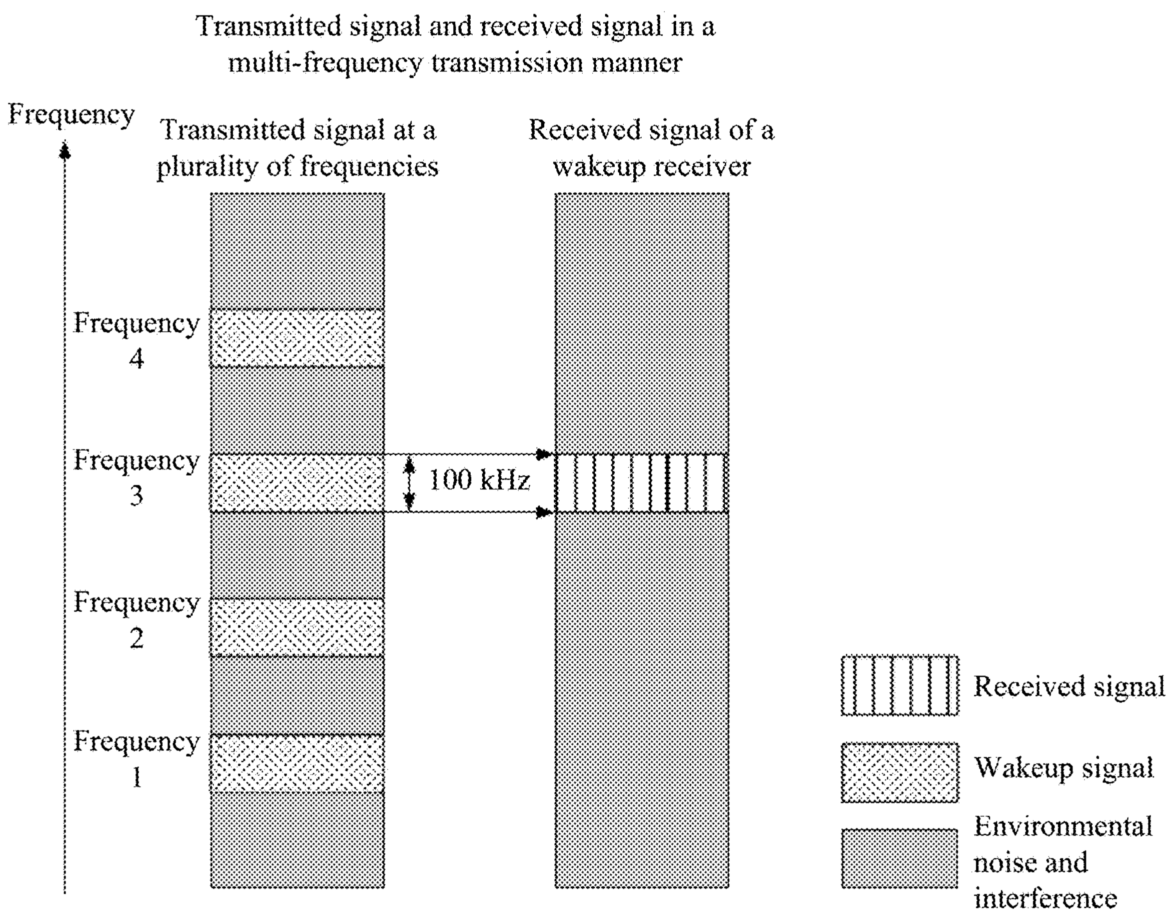
FIG. 9 is an example schematic diagram of a transmitted signal of a transmitter and a received signal of a wakeup receiver in a multi-frequency transmission manner.

FIG. 9 is an example schematic diagram of a transmitted signal of a transmitter and a received signal of a wakeup receiver in a multi-frequency transmission manner. Herein, the received signal of the wakeup receiver is a filtered signal obtained after filtering by the extremely narrow-band band-pass filter 222*a*. Referring to FIG. 9, in this embodiment of this application, the transmitter 100 may transmit the wakeup signal with a narrow bandwidth at four frequencies: a frequency 1, a frequency 2, a frequency 3, and a frequency 4. The wakeup receiver 220 separately performs, by using extremely narrow-band band-pass filters 222*a* in a plurality of signal processing circuits that are connected in parallel and that have different operating frequencies, extremely narrow-band filtering on the input signal received by the receive antenna, and can successfully wake up the primary transceiver 240 provided that a filtered signal obtained by performing filtering by any extremely narrow-band band-pass filter 222*a* at any one of the frequency 1, the frequency 2, the frequency 3, and the frequency 4 is a wakeup signal.

For example, it is assumed that the wakeup receiver 220 includes two signal processing circuits connected in parallel, an operating frequency of a first signal processing circuit is the frequency 2, an operating frequency of a second signal processing circuit is the frequency 3, and transmit frequencies of the transmitter 100 are the frequency 1, the frequency 2, the frequency 3, and the frequency 4. If a temperature drift occurs on the operating frequencies of both the signal processing circuits, an actual operating frequency of the first signal processing circuit after the temperature drift is a frequency 5, and an actual operating frequency of the second signal processing circuit after the temperature drift is the frequency 1, the second signal processing circuit can successfully receive the wakeup signal at the frequency 1 after the temperature drift. If the transmitter 100 transmits the wakeup signal only at a single frequency, for example, transmits the wakeup signal only at the frequency 4, neither of the two signal processing circuits can receive the wakeup signal after the temperature drift.

It can be learned that in the multi-frequency transmission manner, by increasing a quantity of transmit frequencies, a probability that the actual operating frequency of the signal processing circuit after the temperature drift matches the frequency for transmitting the wakeup signal is increased. This can effectively resist impact of the temperature drift.

Still referring to FIG. 9, in this embodiment of this application, a bandwidth of the transmitted wakeup signal is equal to the bandwidth of the extremely narrow-band band-pass filter 222*a* in the wakeup receiver 220 (which is referred to as a receive bandwidth in this specification for ease of description). For example, the bandwidth of the transmitted wakeup signal and the bandwidth of the extremely narrow-band band-pass filter 222*a* in the wakeup receiver 220 may be 100 kHz.

It should be noted that a quantity of frequencies for transmitting the wakeup signal shown in FIG. 9 is merely an example for description. In another embodiment of this application, more or fewer frequencies for transmitting the wakeup signal may be set based on an actual application requirement. The quantity of frequencies for transmitting the wakeup signal is not limited in this embodiment of this application. In addition, the listed bandwidth of the transmitted wakeup signal and the listed bandwidth of the extremely narrow-band band-pass filter 222*a* in the wakeup receiver 220 are also examples for description. In actual application, an upper limit value and an actual bandwidth value of the narrow bandwidth (the bandwidth of the transmitted wakeup signal in the multi-frequency transmission manner and the bandwidth of the extremely narrow-band band-pass filter 222*a* in the wakeup receiver 220) may be determined based on a requirement.

Figure 10:
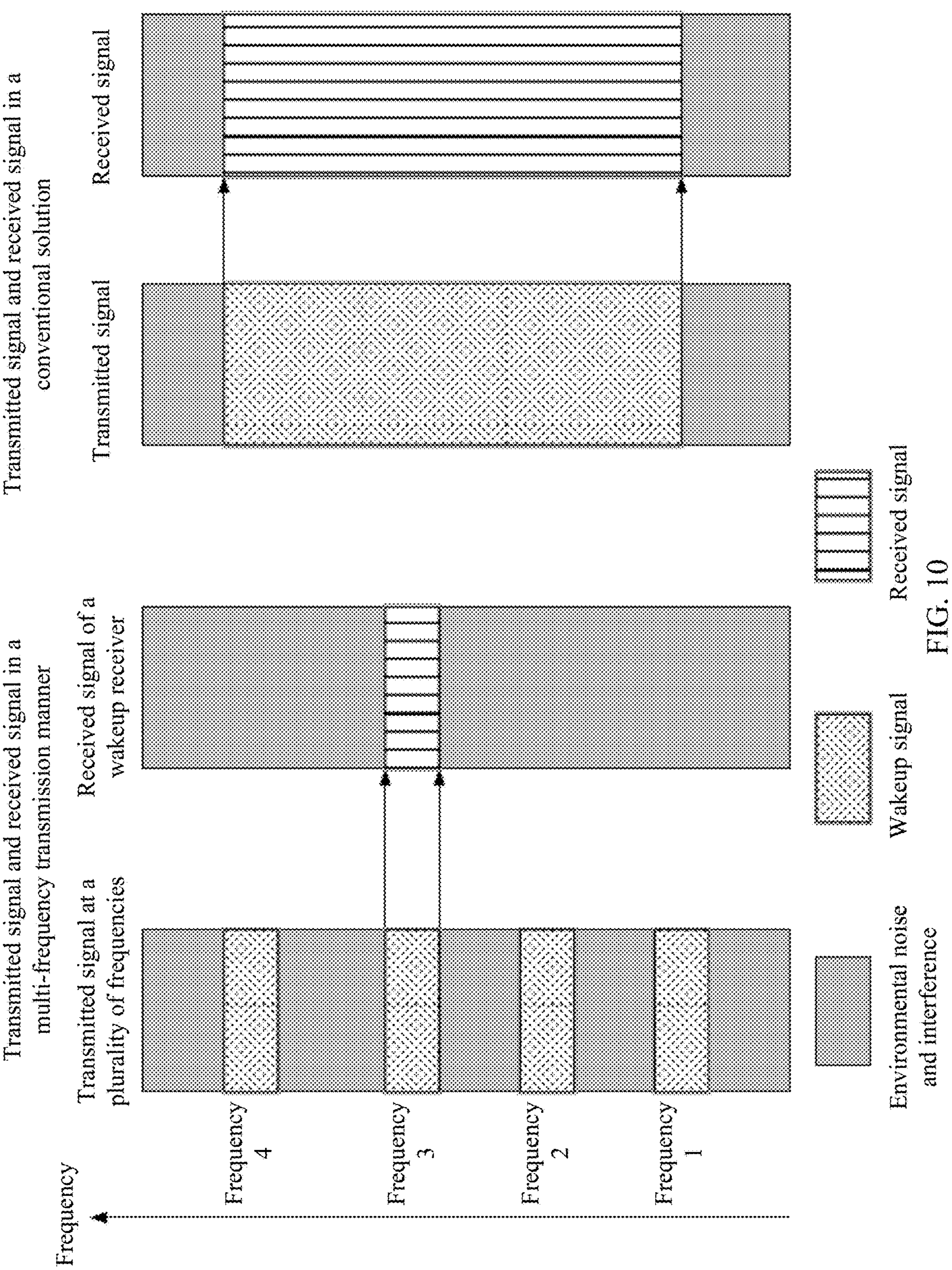
FIG. 10 is an example schematic diagram of bandwidth comparison between a transmitted signal of a transmitter and a received signal of a wakeup receiver in a multi-frequency transmission manner and a transmitted signal of a transmitter and a received signal of a wakeup receiver in a conventional solution.

FIG. 10 is an example schematic diagram of bandwidth comparison between a transmitted signal of a transmitter and a received signal of a wakeup receiver in a multi-frequency transmission manner and a transmitted signal of a transmitter and a received signal of a wakeup receiver in a conventional solution. Herein, the received signal of the wakeup receiver in the multi-frequency transmission manner is a filtered signal obtained after filtering by the extremely narrow-band band-pass filter 222*a*. Referring to FIG. 10, both the transmitted signal of the transmitter and the received signal of the wakeup receiver in the multi-frequency transmission manner are extremely narrow-band signals, while both the transmitted signal of the transmitter and the received signal of the receiver in the conventional solution are wideband signals. Compared with that in the conventional solution, in this embodiment of this application, the received signal of the wakeup receiver is a signal with a narrow bandwidth, and more noise and interference can be filtered out, and therefore an anti-interference capability is improved. In addition, in this embodiment of this application, the transmit power of the transmitter 100 is concentrated in the narrow bandwidth at which the wakeup signal is located, and higher power density is achieved compared with a wideband transmitted signal in a related solution. Therefore, the wakeup receiver in this embodiment of this application has a higher signal-to-interference ratio.

Figure 12:
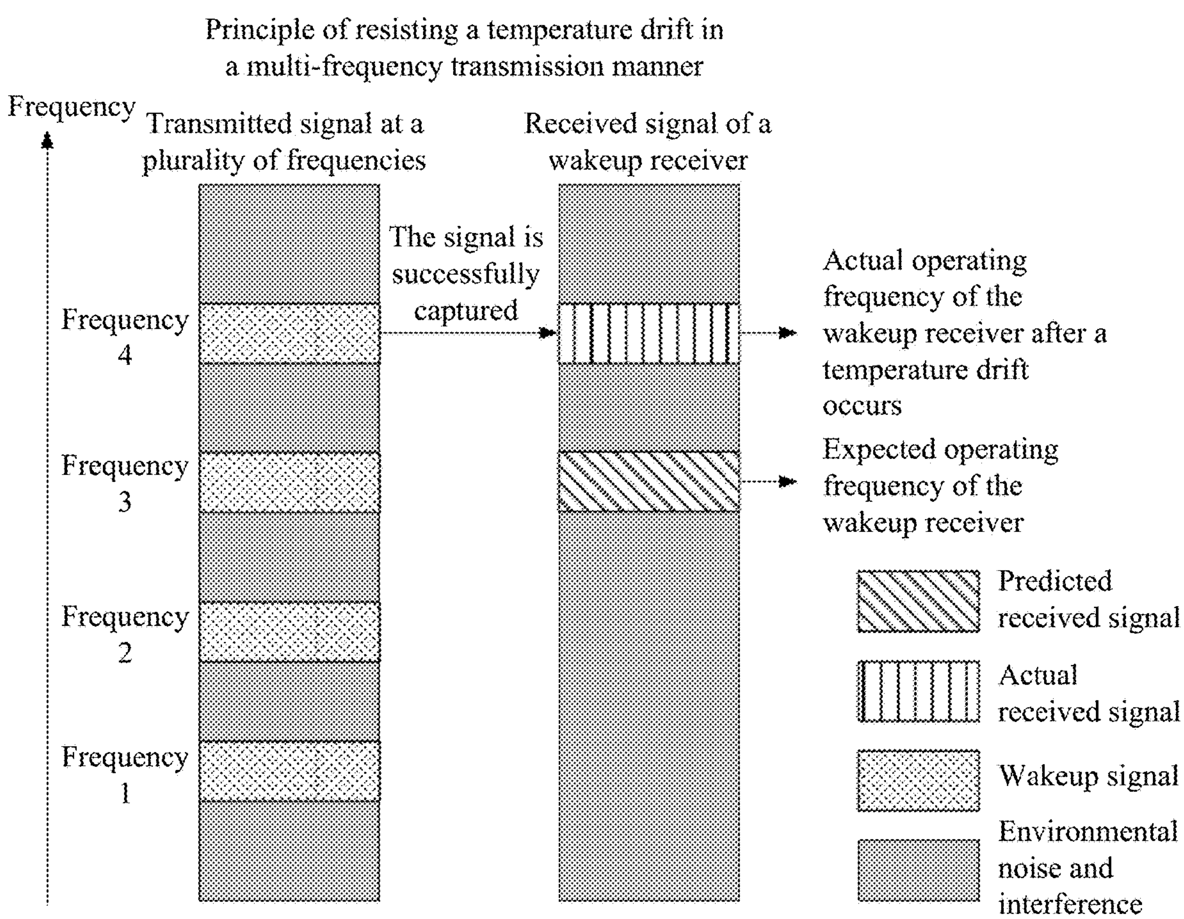
FIG. 12 is an example schematic diagram of a principle of resisting a temperature drift in a multi-frequency transmission manner.

FIG. 12 is an example schematic diagram of a principle of resisting a temperature drift in a multi-frequency transmission manner. Referring to FIG. 12, it is assumed that an operating frequency of the wakeup receiver is set to a frequency 3 during design. During actual operation, the operating frequency of the wakeup receiver is changed to a frequency 4 due to impact of the temperature drift. In this case, even if a temperature drift occurs, because the transmitter transmits the wakeup signal at both the frequency 3 and the frequency 4, the wakeup receiver can still receive the wakeup signal at the actual operating frequency (the frequency 4) existing after the temperature drift occurs, so that the primary receiver can be successfully woken up when a temperature drift exists.

Figure 11:
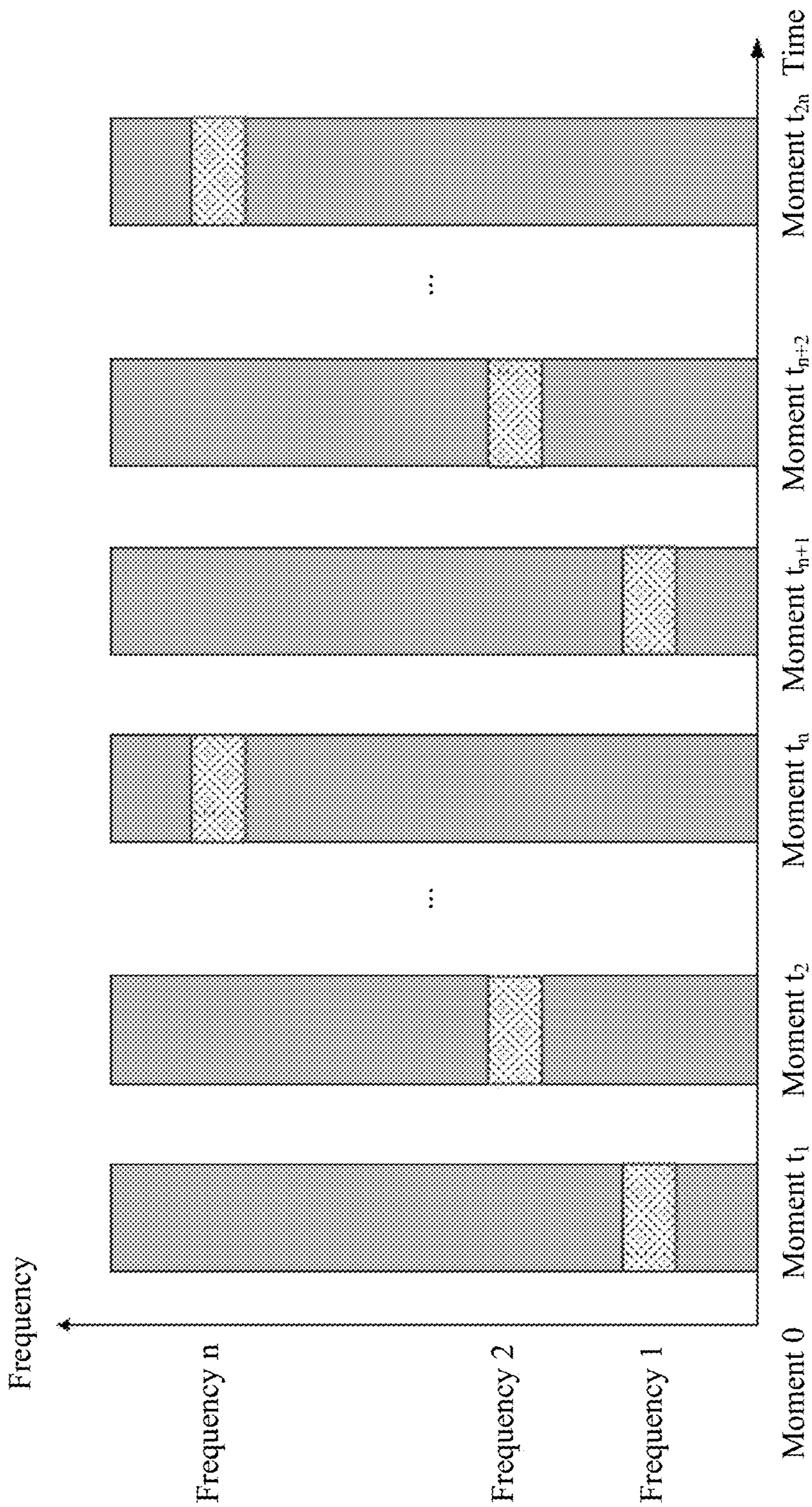
FIG. 11 is an example sequence diagram in which a transmitter 100 transmits a wakeup signal.

In the multi-frequency transmission manner, in an example, the transmitter 100 may transmit the wakeup signal at each frequency based on a preset transmission period, and in each transmission period, transmit the wakeup signal at frequencies in a time division manner based on a preset transmission sequence. FIG. 11 is an example sequence diagram in which a transmitter 100 transmits a wakeup signal. Referring to FIG. 11, it is assumed that frequencies used by the transmitter 100 to transmit the wakeup signal include n frequencies: a frequency 1, a frequency 2, . . . , and a frequency n. At a moment t1, the transmitter 100 transmits the wakeup signal at the frequency 1; at a moment t2, the transmitter 100 transmits the wakeup signal at the frequency 1; . . . ; at a moment tn, the transmitter 100 transmits the wakeup signal at the frequency n; at a moment tn+1, the transmitter 100 transmits the wakeup signal at the frequency 1; at a moment tn+2, the transmitter 100 transmits the wakeup signal at the frequency 1; . . . ; and at a moment t2*n*, the transmitter 100 transmits the wakeup signal at the frequency n. Herein, t2*n*=2tn.

In another example of the multi-frequency transmission manner, the transmitter 100 may transmit the wakeup signal at each frequency based on a preset transmission period, and in each transmission period, sense each frequency, and transmit the wakeup signal at the frequency when the frequency meets a preset idle condition. When a plurality of frequencies meet the preset idle condition at a same moment, the wakeup signal may be transmitted at a frequency with a highest priority based on preset frequency priorities.

In this embodiment of this application, sensing may be performed by using a carrier sense multiple access with collision avoidance (Carrier Sense Multiple Access with Collision Avoidance, CSMA/CA) technology. Certainly, the CSMA/CA technology is merely an example of a sensing technology in this embodiment of this application. The sensing technology is not limited in this embodiment of this application.

In an example, the idle condition may be, for example, that continuous idle duration of a frequency reaches a preset time threshold. The time threshold may be determined based on an application requirement.

In the multi-frequency transmission manner, a same sensing procedure may be used for all transmit frequencies. The following describes a sensing procedure of each frequency by using an example.

Figure 13:
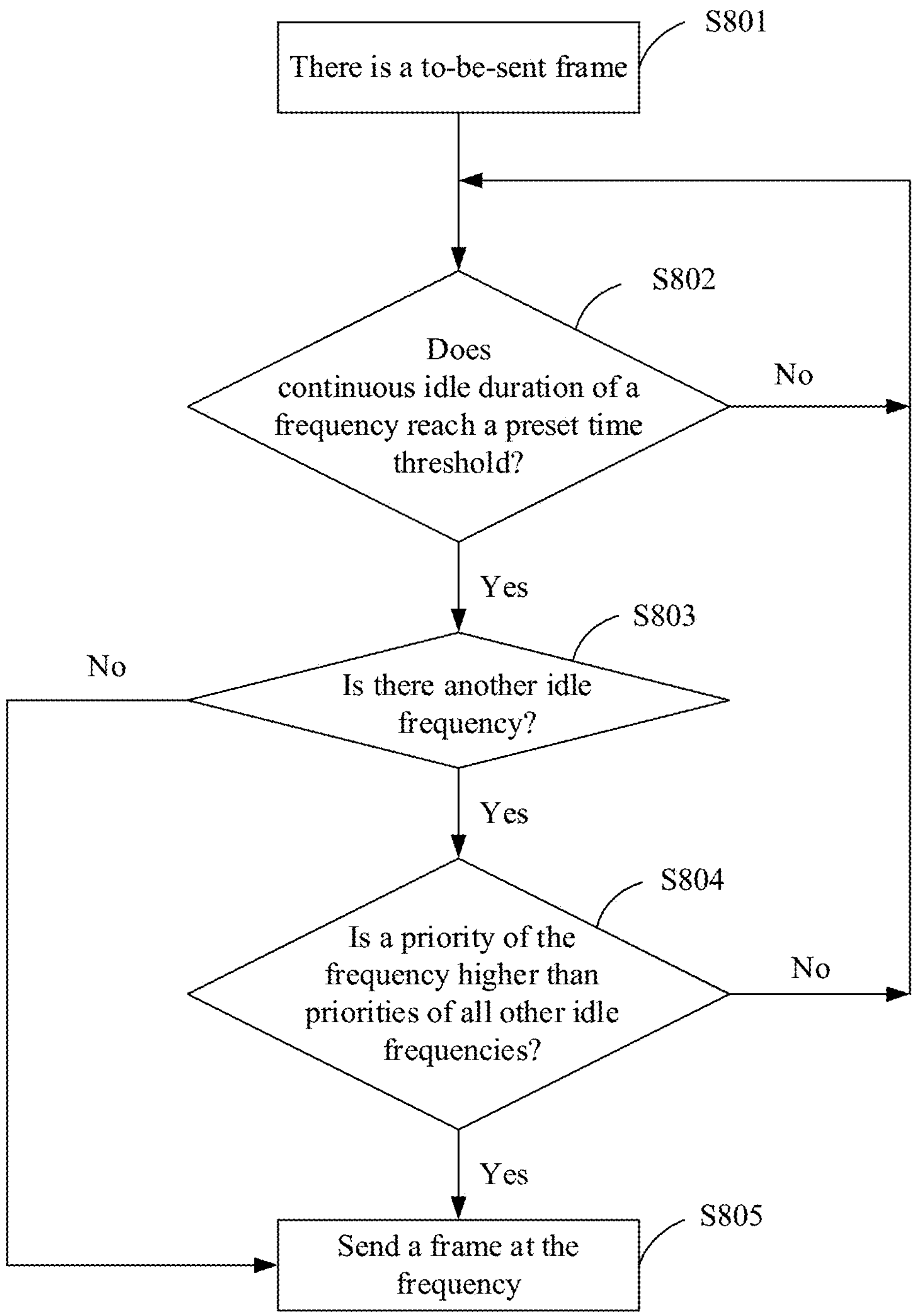
FIG. 13 is an example flowchart of sensing of a frequency for transmitting a wakeup signal.

FIG. 13 is an example flowchart of sensing of a frequency for transmitting a wakeup signal. Referring to FIG. 13, for each frequency for transmitting the wakeup signal, a sensing process may include the following steps.

Step S801: Start sensing when there is a to-be-sent wakeup signal physical frame at the frequency.

In each transmission period, there is a to-be-sent wakeup signal physical frame at each frequency for transmitting the wakeup signal. It is assumed that the transmission period is T. If a wakeup signal physical frame corresponding to a frequency fj has not been sent in the transmission period T, it is determined that there is a to-be-sent wakeup signal physical frame at the frequency fj. If a wakeup signal physical frame corresponding to the frequency fj has been sent in the transmission period T, it is determined that there is no to-be-sent wakeup signal physical frame at the frequency fj.

Step S802: Determine whether continuous idle duration of the frequency reaches the preset time threshold. If the continuous idle duration of the frequency reaches the preset time threshold, step S803 is performed. Otherwise, if the continuous idle duration of the frequency does not reach the preset time threshold, step S802 is performed.

In an example, when each transmission period T starts, a timer may be started for each frequency for transmitting the wakeup signal, to accumulate idle time of the frequency. If the frequency is occupied in an accumulation process, an accumulated time of the timer is reset, and accumulation is performed again. In this way, whether the continuous idle duration of the frequency reaches the preset time threshold may be determined by querying a current accumulated time of the timer corresponding to the frequency and comparing the current accumulated time with the preset time threshold.

Step S803: Determine whether there is another idle frequency currently. If there is another idle frequency currently, step S804 is performed. Otherwise, if there is no another idle frequency currently, step S805 is performed.

Step S804: When there is another idle frequency currently, determine whether a priority of the frequency is higher than priorities of all other idle frequencies. If the priority of the frequency is higher than the priorities of all the other idle frequencies, step S805 is performed. Otherwise, if at least one of the other idle frequencies has a priority higher than the priority of the frequency, step S802 is performed.

In the multi-frequency transmission manner, a priority of each frequency may be preset.

Step S805: Send a wakeup signal physical frame at the frequency, and end the sensing process of the frequency in the current transmission period.

In this embodiment of this application, before the wakeup signal is transmitted, the frequency for transmitting the wakeup signal is sensed, and an occasion on which the frequency is idle may be selected to transmit the wakeup signal at the frequency. In this way, a probability that the wakeup signal is interfered with can be reduced, signal quality can be improved, and therefore a wakeup success rate is increased, and a wakeup delay is reduced.

Figure 14:
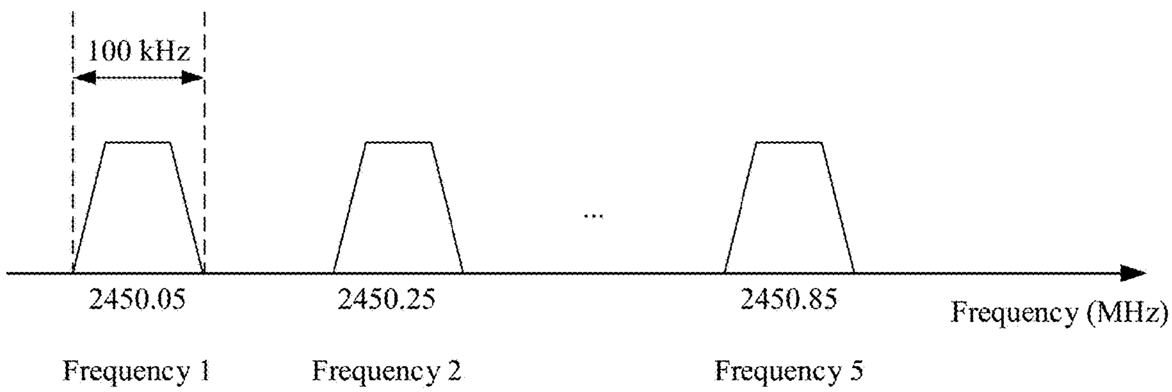
FIG. 14 is an example schematic diagram in which a plurality of frequencies for transmitting a wakeup signal are non-adjacent frequencies.

In an example, the plurality of frequencies used by the transmitter 100 to transmit the wakeup signal may be non-adjacent. For example, FIG. 14 is an example schematic diagram in which a plurality of frequencies for transmitting a wakeup signal are non-adjacent frequencies. Referring to FIG. 14, in this embodiment of this application, there are five frequencies used by the transmitter 100 to transmit the wakeup signal, the five frequencies are 2450.05 MHz, 2450.25 MHz, . . . , and 2450.85 MHz, an interval between every two frequencies is 200 kHz, and a bandwidth of the wakeup signal is 100 kHz.

Figure 15:
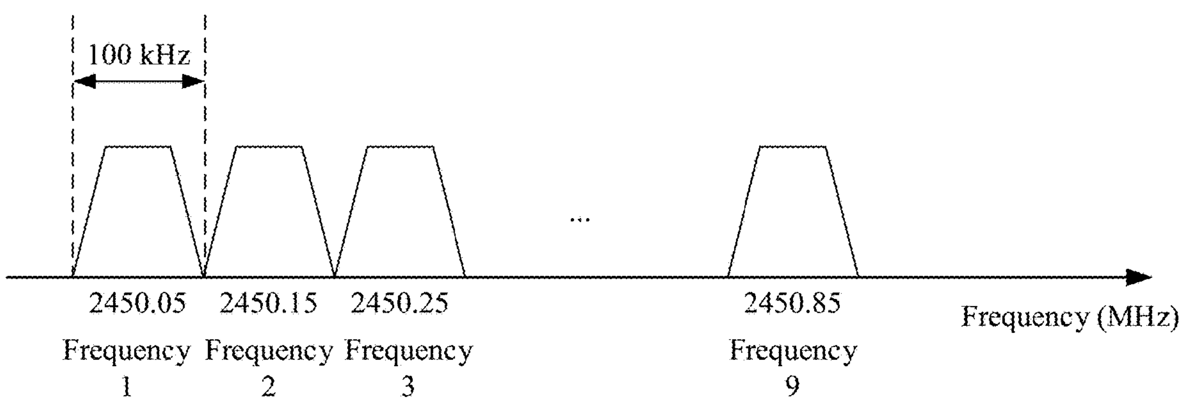
FIG. 15 is an example schematic diagram in which a plurality of frequencies for transmitting a wakeup signal are adjacent frequencies.

In another example, the plurality of frequencies used by the transmitter 100 to transmit the wakeup signal may be adjacent. For example, FIG. 15 is an example schematic diagram in which a plurality of frequencies for transmitting a wakeup signal are adjacent frequencies. Referring to FIG. 15, in this embodiment of this application, there are nine frequencies used by the transmitter 100 to transmit the wakeup signal, the nine frequencies are 2450.05 MHz, 2450.15 MHz, 2450.25 MHz, . . . , and 2450.85 MHz, an interval between every two frequencies is 100 kHz, and a bandwidth of the wakeup signal is 100 kHz.

In an example, in the multi-frequency transmission manner, a quantity of frequencies used by the transmitter 100 to transmit the wakeup signal may be greater than a quantity of operating frequencies of the wakeup receiver 220, and the frequencies used by the transmitter 100 to transmit the wakeup signal at least partially coincide with the operating frequencies of the wakeup receiver 220.

Figure 16:
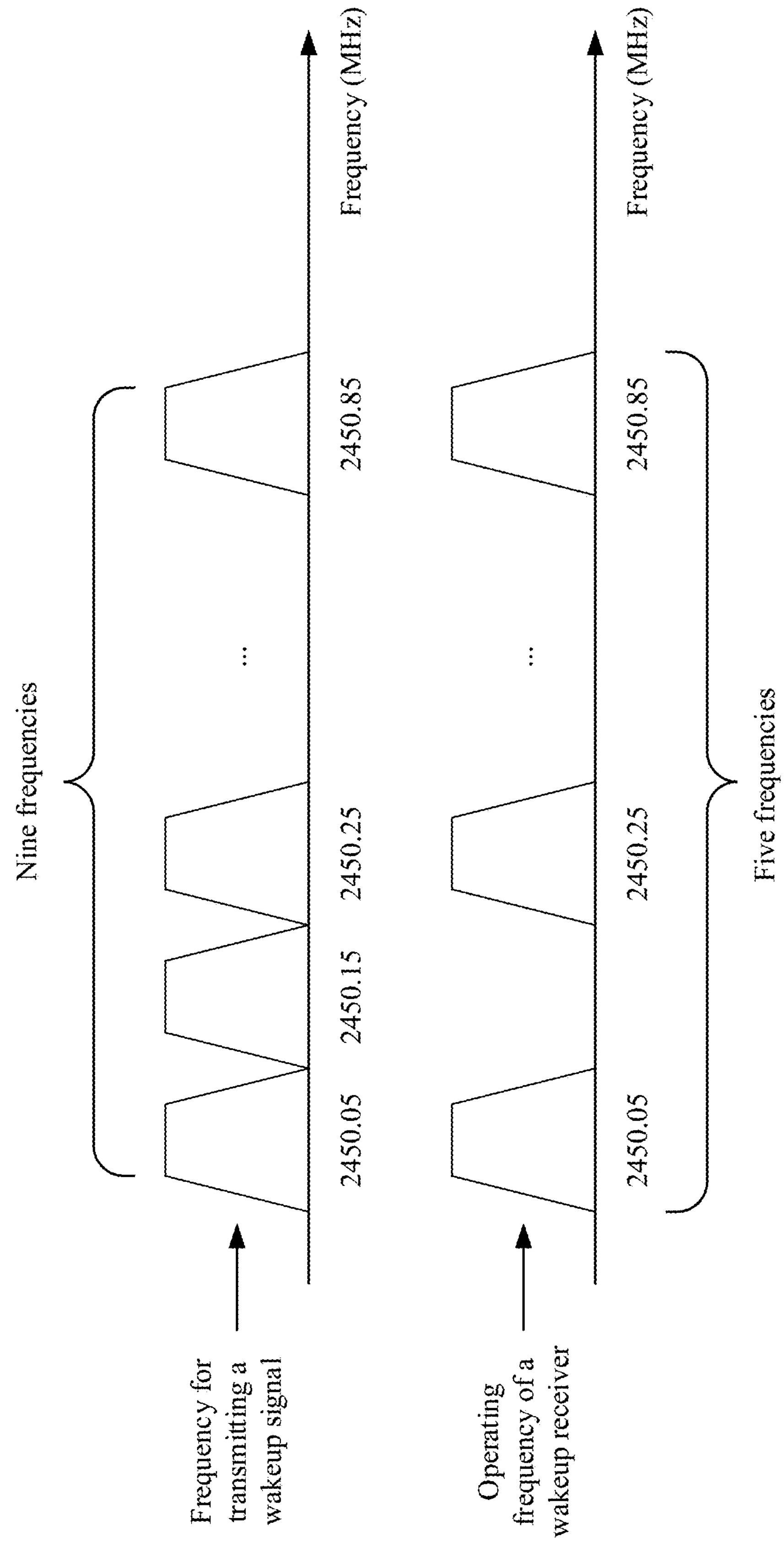
FIG. 16 is an example schematic diagram of comparison between a frequency for transmitting a wakeup signal and an operating frequency of a wakeup receiver.

For example, in the multi-frequency transmission manner, the frequencies used by the transmitter 100 to transmit the wakeup signal may cover all operating frequencies of the wakeup receiver 220. For example, FIG. 16 is an example schematic diagram of comparison between a frequency for transmitting a wakeup signal and an operating frequency of a wakeup receiver. Referring to FIG. 16, frequencies for transmitting the wakeup signal are 2450.05 MHz, 2450.15 MHz, 2450.25 MHz, . . . , and 2450.85 MHz (a total of nine frequencies), operating frequencies of the wakeup receiver 220 are 2450.05 MHz, 2450.25 MHz, . . . , and 2450.85 MHz (a total of five frequencies), and the nine frequencies for transmitting the wakeup signal cover all the five operating frequencies of the wakeup receiver.

For example, in the multi-frequency transmission manner, a minimum frequency used by the transmitter 100 to transmit the wakeup signal is less than a minimum operating frequency of the wakeup receiver 220, and a maximum frequency used by the transmitter 100 to transmit the wakeup signal is greater than a maximum operating frequency of the wakeup receiver 220. For example, frequencies for transmitting the wakeup signal are 2450.05 MHz, 2450.15 MHz, 2450.25 MHz, . . . , and 2450.85 MHz (a total of nine frequencies), and operating frequencies of the wakeup receiver 220 are 2450.25 MHz, 2450.45 MHz, and 2450.65 MHz (a total of three frequencies).

In an example, a frequency range corresponding to the bandwidth for transmitting the wakeup signal may cover all the operating frequencies of the wakeup receiver 220, a minimum frequency in the frequency range corresponding to the bandwidth for transmitting the wakeup signal is less than a minimum frequency in a receive frequency range corresponding to the minimum operating frequency of the wakeup receiver 220, and a maximum frequency in the frequency range corresponding to the bandwidth for transmitting the wakeup signal is greater than a maximum frequency in a receive frequency range corresponding to the maximum operating frequency of the wakeup receiver 220.

In the foregoing example, the frequencies used by the transmitter 100 to transmit the wakeup signal cover all the operating frequencies of the wakeup receiver 220, and a probability that the wakeup receiver 220 captures the wakeup signal is greatly increased. Therefore, a wakeup delay can be reduced, and user experience can be improved.

In another example, a quantity of frequencies used by the transmitter 100 to transmit the wakeup signal may be less than or equal to a quantity of operating frequencies of the wakeup receiver 220. In this case, the operating frequencies of the wakeup receiver 220 may cover some or all frequencies used by the transmitter 100 to transmit the wakeup signal.

A second manner of transmitting the wakeup signal is a high-bandwidth transmission manner, that is, the wakeup signal is transmitted by using a bandwidth greater than a bandwidth required by the wakeup signal.

Figure 17:
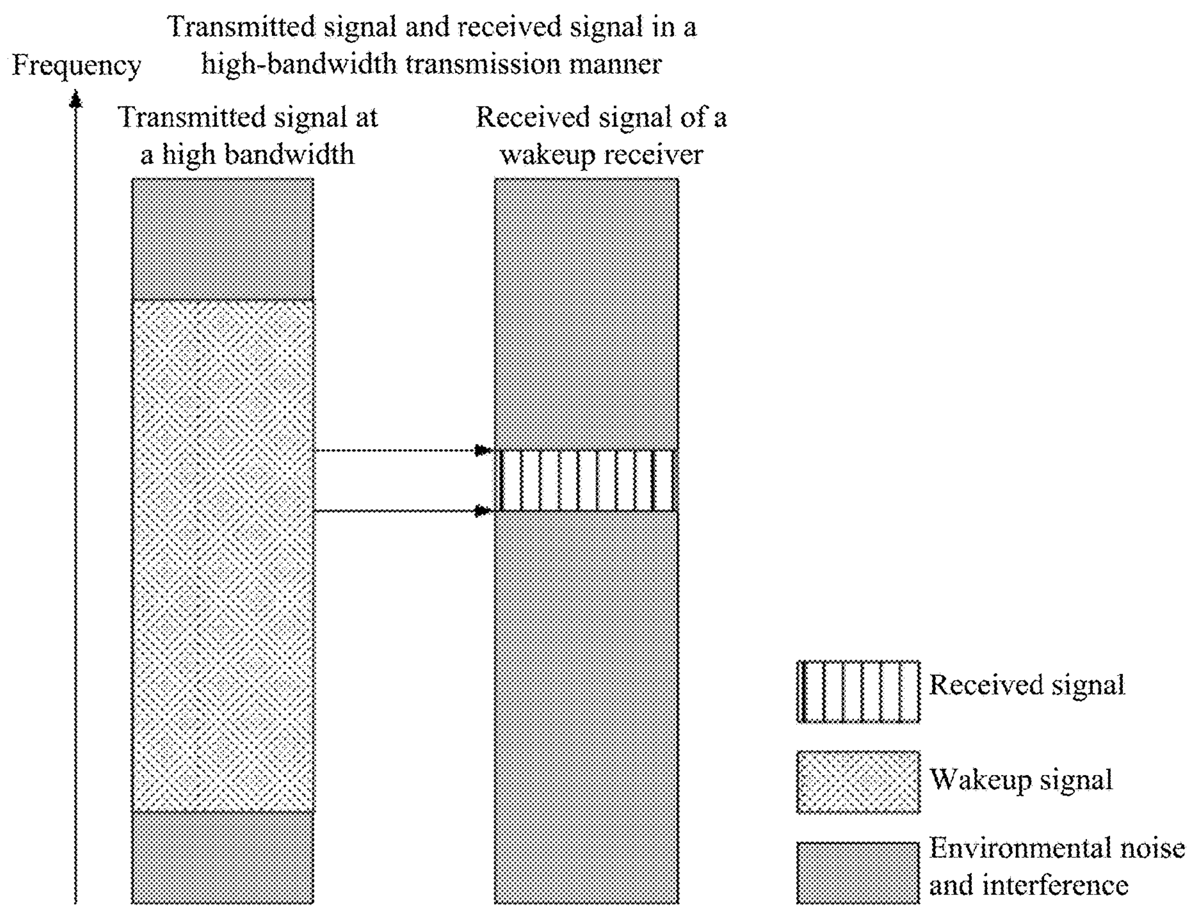
FIG. 17 is an example schematic diagram of a transmitted signal of a transmitter and a received signal of a wakeup receiver in a high-bandwidth transmission manner.

FIG. 17 is an example schematic diagram of a transmitted signal of a transmitter and a received signal of a wakeup receiver in a high-bandwidth transmission manner. Referring to FIG. 17, in the high-bandwidth transmission manner, the transmitter 100 may transmit the wakeup signal by using a bandwidth, for example, 1 MHz, greater than the bandwidth (assumed to be 100 kHz) required by the wakeup signal. The wakeup receiver 220 receives a wakeup signal within an extremely narrow-band range by using extremely narrow-band band-pass filters **222*a* in a plurality of signal processing circuits that are connected in parallel and that have different operating frequencies. Provided that an operating frequency of any extremely narrow-band band-pass filter 222***a* falls within the bandwidth (for example, 1 MHz) used by the transmitter 100 to transmit the wakeup signal, the wakeup receiver 220 can successfully receive the wakeup signal with the bandwidth of 100 kHz, and therefore the primary transceiver 240 can be successfully woken up.

For example, it is assumed that the bandwidth used by the transmitter 100 to transmit the wakeup signal is 1 MHz (for example, a corresponding frequency range is from 2450 MHz to 2451 MHz), the wakeup receiver 220 includes two signal processing circuits connected in parallel, a receive bandwidth of the wakeup receiver 220 is 100 kHz, an operating frequency of a first signal processing circuit is 2450.05 MHz (a corresponding receive frequency range is from 2450 MHz to 2450.1 MHz), and an operating frequency of a second signal processing circuit is 2450.25 MHz (a corresponding receive frequency range is from 2450.2 MHz to 2450.3 MHz). If a temperature drift occurs on the operating frequencies of both the two signal processing circuits, for example, an actual operating frequency of the first signal processing circuit after the temperature drift is 2449.95 MHz (a corresponding actual receive frequency range is from 2449.9 MHz to 2450 MHz), and an actual operating frequency of the second signal processing circuit existing after the temperature drift is 2450.65 MHz (a corresponding actual receive frequency range is from 2450.6 MHz to 2450.7 MHz), the second signal processing circuit can still receive the wakeup signal within a frequency range of 2450 MHz to 2451 MHz after the temperature drift. However, if a frequency range in which the transmitter 100 transmits the wakeup signal is from 2450 MHz to 2450.1 MHz, neither of the first signal processing circuit and the second signal processing circuit can receive the wakeup signal after the temperature drift.

It can be learned that in the high-bandwidth transmission manner, by increasing the transmit bandwidth, a probability that the receive frequency range corresponding to the actual operating frequency of the signal processing circuit after the temperature drift is covered by the transmit bandwidth is increased. This increases a probability of successfully receiving the wakeup signal, and can effectively resist impact of the temperature drift.

Figure 18:
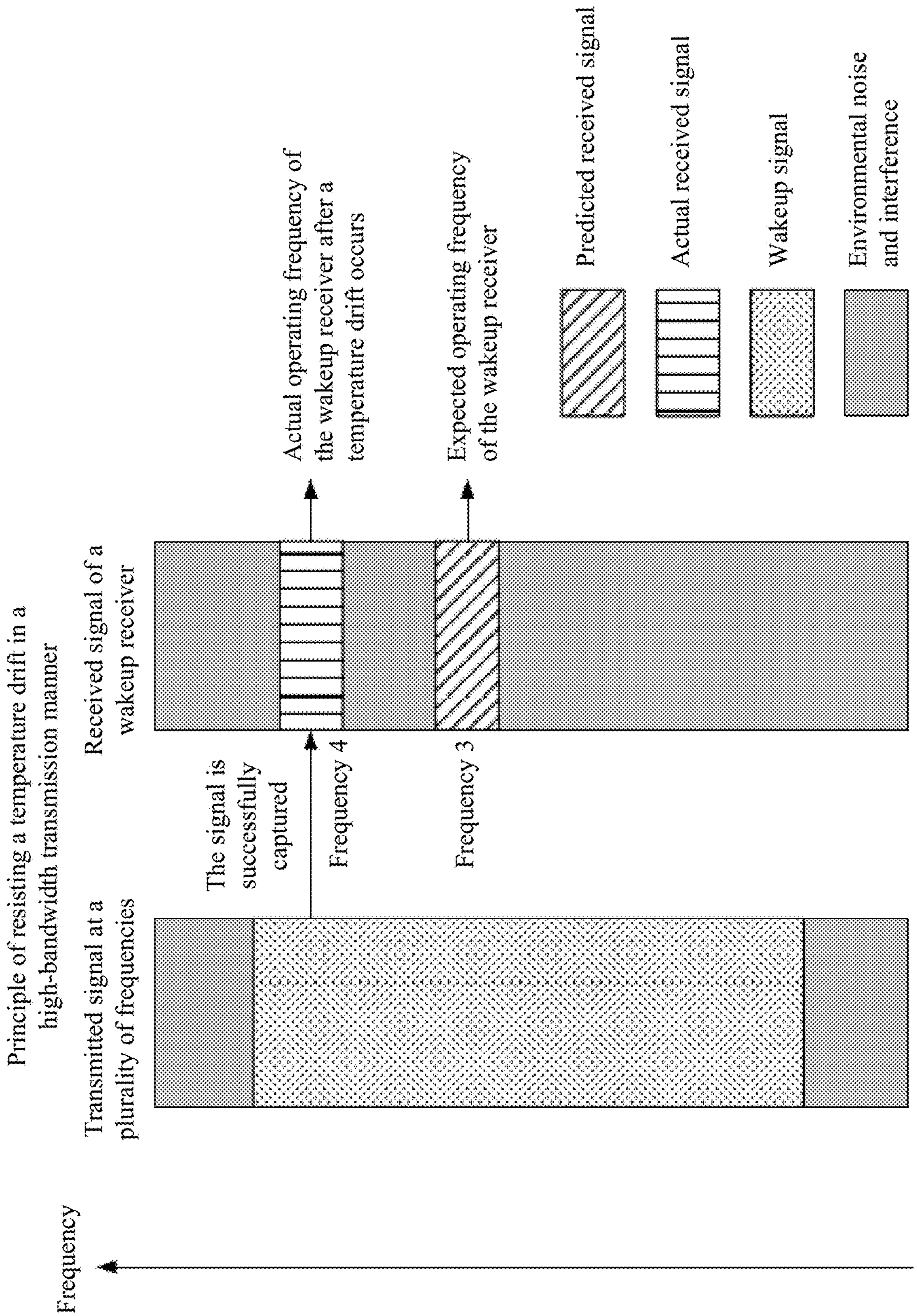
FIG. 18 is an example schematic diagram of a principle of resisting a temperature drift in a high-bandwidth transmission manner.

FIG. 18 is an example schematic diagram of a principle of resisting a temperature drift in a high-bandwidth transmission manner. Referring to FIG. 18, it is assumed that an operating frequency of the wakeup receiver is set to a frequency 3 during design. During actual operation, the operating frequency of the wakeup receiver is changed to a frequency 4 due to impact of the temperature drift. In this case, even if a temperature drift occurs, because the transmit bandwidth of the transmitter completely covers wakeup signal ranges of the frequency 3 and the frequency 4, the wakeup receiver can still receive the wakeup signal at the actual operating frequency (the frequency 4) existing after the temperature drift occurs, so that the primary receiver can be successfully woken up when a temperature drift exists.

In an example, the frequency range corresponding to the bandwidth for transmitting the wakeup signal may cover all receive frequency ranges corresponding to all operating frequencies of the wakeup receiver 220, a minimum frequency in the frequency range corresponding to the bandwidth for transmitting the wakeup signal is less than a minimum frequency in a receive frequency range corresponding to a minimum operating frequency of the wakeup receiver 220, and a maximum frequency in the frequency range corresponding to the bandwidth for transmitting the wakeup signal is greater than a maximum frequency in a receive frequency range corresponding to a maximum operating frequency of the wakeup receiver 220.

Figure 19:
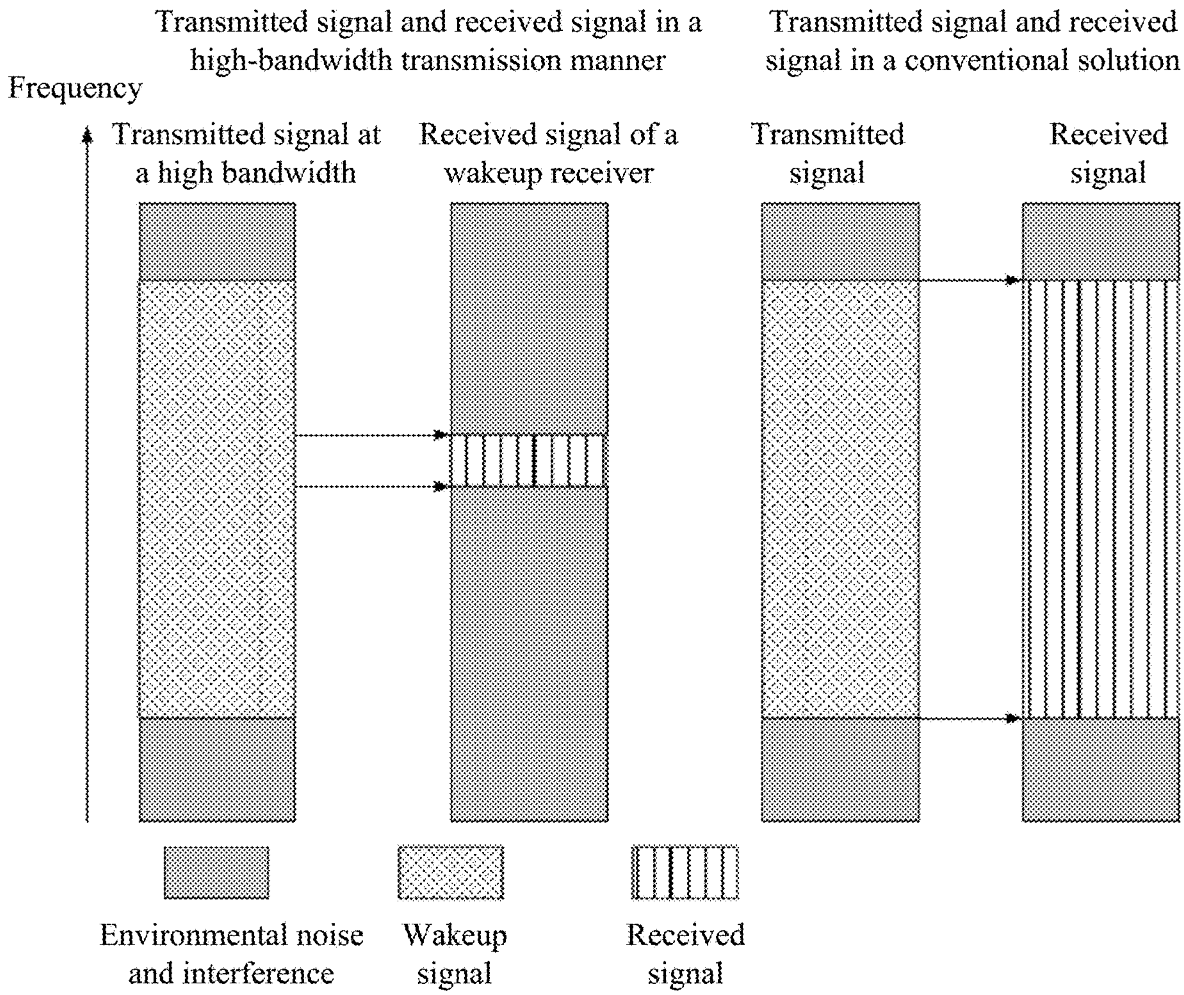
FIG. 19 is an example schematic diagram of bandwidth comparison between a transmitted signal of a transmitter and a received signal of a wakeup receiver in a high-bandwidth transmission manner and a transmitted signal of a transmitter and a received signal of a wakeup receiver in a conventional solution.

FIG. 19 is an example schematic diagram of bandwidth comparison between a transmitted signal of a transmitter and a received signal of a wakeup receiver in a high-bandwidth transmission manner and a transmitted signal of a transmitter and a received signal of a wakeup receiver in a conventional solution. Referring to FIG. 19, a bandwidth of the transmitted signal of the transmitter in the high-bandwidth transmission manner is the same as a bandwidth of the transmitted signal of the transmitter in the conventional solution, but a bandwidth of the received signal of the wakeup receiver in the high-bandwidth transmission manner is far less than a bandwidth of the received signal of the receiver in the conventional solution. In this way, compared with that in the conventional solution, the wakeup receiver in the high-bandwidth transmission manner in this embodiment of this application can filter out more noise and interference and has a higher signal-to-interference ratio, and an anti-interference capability is improved.

In this embodiment of this application, the transmitter 100 and the wakeup receiver 220 separately store physical frame structure information of the wakeup signal. In this way, the transmitter 100 determines a to-be-transmitted wakeup signal physical frame based on the stored physical frame structure information, and the wakeup receiver 220 identifies, based on the stored physical frame structure information, whether the filtered signal obtained through filtering by each signal processing circuit is a wakeup signal.

Figure 20:
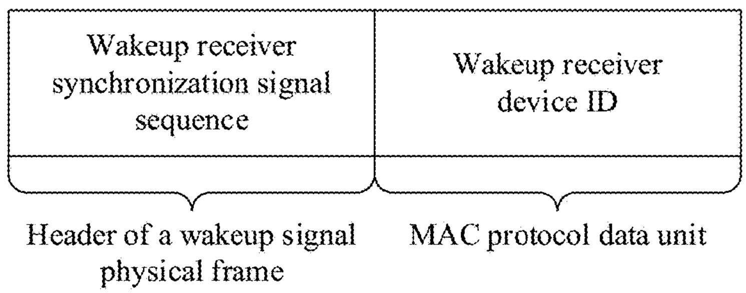
FIG. 20 is an example diagram of a wakeup signal physical frame structure.

In an example, the wakeup signal may use a customized physical frame structure. FIG. 20 is an example diagram of a wakeup signal physical frame structure. Referring to FIG. 20, the wakeup signal physical frame may include a header and a media access control address (Media Access Control Address, MAC) protocol data unit. The header of the wakeup signal physical frame carries a wakeup receiver synchronization signal sequence, and the MAC protocol data unit carries a wakeup receiver device ID. The physical frame structure information of the wakeup signal stored in the transmitter 100 and the wakeup receiver 220 includes content of the wakeup receiver synchronization signal sequence. The wakeup receiver 220 stores a wakeup receiver device ID of the wakeup receiver 220, and each wakeup receiver device ID corresponds to the primary transceiver 240. In this way, the wakeup receiver 220 can identify, based on the wakeup receiver synchronization signal sequence, whether a received signal is a wakeup signal, and identify, based on the wakeup receiver device ID, whether the primary transceiver 240 in the second electronic device in which the wakeup receiver 220 is located is a wakeup object.

For example, it is assumed that the header of the wakeup signal physical frame includes x bits (bit), and the MAC protocol data unit m includes y bits, where x and y are natural numbers. The wakeup receiver 220 extracts first x-bit data from a physical frame corresponding to the received signal, compares the x-bit data with the wakeup receiver synchronization signal sequence stored in the wakeup receiver 220, and if the x-bit data and the wakeup receiver synchronization signal sequence match, determines that the received signal is a wakeup signal. The wakeup receiver 220 extracts last y-bit data from the physical frame corresponding to the received signal, compares the y-bit data with the wakeup receiver device ID stored in the wakeup receiver 220, and if the y-bit data and the wakeup receiver device ID match, determines that the primary transceiver 240 in the second electronic device in which the wakeup receiver 220 is located is a wakeup object.

Herein, "match" may mean that a correlation indicator value between the two pieces of compared data is greater than or equal to the preset correlation threshold. The correlation indicator value between the two pieces of compared data may be obtained in a correlation calculation manner in a related technology. A manner of calculating the correlation indicator value is not limited in this embodiment of this application. Details are not described herein.

Figure 21:
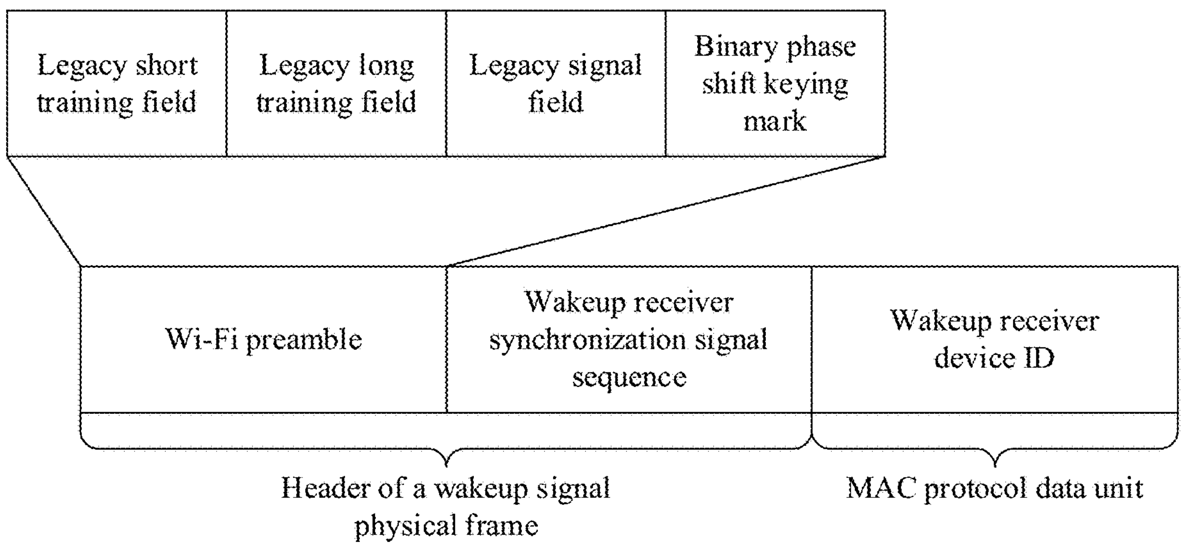
FIG. 21 is an example diagram of another wakeup signal physical frame structure.

In another example, a physical frame structure that complies with a stipulation in a communication protocol in 802.11 may be used for the wakeup signal. FIG. 21 is an example diagram of another wakeup signal physical frame structure. Referring to FIG. 21, the wakeup signal physical frame is a wakeup signal physical frame that complies with a stipulation in a Wi-Fi protocol, and the wakeup signal physical frame still includes a header and a MAC protocol data unit. A difference from the wakeup signal physical frame structure shown in FIG. 20 is that the header of the wakeup signal physical frame in FIG. 21 carries a Wi-Fi preamble and a wakeup receiver synchronization signal sequence. For example, the Wi-Fi preamble may include a legacy short training field (Legacy Short Training Field, L-STF), a legacy long training field (Legacy Long Training Field, L-LTF), a legacy signal field (Legacy Signal Field, L-SIG), and a binary phase shift keying mark (Binary Phase Shift Keying Mark, BPSK-Mark). The MAC protocol data unit of the wakeup signal physical frame in FIG. 21 carries a wakeup receiver device ID. The physical frame structure information of the wakeup signal stored in the transmitter 100 and the wakeup receiver 220 includes the Wi-Fi preamble and content of the wakeup receiver synchronization signal sequence. The wakeup receiver 220 stores a wakeup receiver device ID of the wakeup receiver 220, and each wakeup receiver device ID corresponds to the primary transceiver 240. In this way, the wakeup receiver 220 may identify, based on the Wi-Fi preamble and the wakeup receiver synchronization signal sequence, whether a received signal is a wakeup signal, and identify, based on the wakeup receiver device ID, whether the primary transceiver 240 in the second electronic device in which the wakeup receiver 220 is located is a wakeup object.

For example, it is assumed that the header of the wakeup signal physical frame includes a z-bit Wi-Fi preamble and an x-bit wakeup receiver synchronization signal sequence, and the MAC protocol data unit m includes y bits, where x, y, and z are natural numbers. The wakeup receiver 220 extracts first (z+x)-bit data from a physical frame corresponding to the received signal, compares first z-bit data in the (z+x)-bit data with the Wi-Fi preamble stored in the wakeup receiver 220 to obtain a first matching result, compares last x-bit data in the (z+x)-bit data with the wakeup receiver synchronization signal sequence stored in the wakeup receiver 220 to obtain a second matching result, and if both the first matching result and the second matching result indicate a match, determines that the received signal is a wakeup signal. The wakeup receiver 220 extracts last y-bit data from the physical frame corresponding to the received signal, compares the y-bit data with the wakeup receiver device ID stored in the wakeup receiver 220, and if the y-bit data and the wakeup receiver device ID match, determines that the primary transceiver 240 in the second electronic device in which the wakeup receiver 220 is located is a wakeup object.

It should be noted that the wakeup signal physical frame structure shown in FIG. 21 is merely an example. In another embodiment of this application, a wakeup signal physical frame structure that complies with a stipulation in another communication protocol such as a Bluetooth protocol or a D2D protocol may be used. The wakeup signal physical frame structure is not limited in this embodiment of this application.

It should be noted that in an example, the wakeup receiver device ID in the wakeup signal transmitted by the transmitter 100 may correspond to one second electronic device, and in this case, the wakeup signal is used to wake up the second electronic device. In another example, the wakeup receiver device ID in the wakeup signal transmitted by the transmitter 100 may correspond to a group of second electronic devices (wakeup receiver device IDs corresponding to all second electronic devices in a same group are the same), and in this case, the wakeup signal is used to wake up the group of second electronic devices.

Herein, the wakeup method in the embodiments of this application is further described in detail by using an example.

In this embodiment of this application, the first electronic device is a Wi-Fi router, and the Wi-Fi router includes the transmitter 100 shown in FIG. 4; and the second electronic device is a mobile phone, the mobile phone includes the receiver 200 shown in FIG. 4, and the primary transceiver 240 is a Wi-Fi module in the mobile phone. In a standby process of the mobile phone, the Wi-Fi module in the mobile phone is in a sleeping state, and a wakeup receiver in the mobile phone is in a working state.

A procedure in which the Wi-Fi router wakes up the Wi-Fi module in the mobile phone may include the following steps.

The Wi-Fi router receives information A that needs to be forwarded to an application a in the mobile phone, and triggers a wakeup procedure.

The Wi-Fi router uses T as a period, and transmits a wakeup signal at s frequencies in a time division manner in each period T, where s is a natural number. The wakeup signal includes a wakeup sequence 1, and the wakeup sequence 1 includes a device ID 1.

After receiving the wakeup signal, a receive antenna in the mobile phone outputs the wakeup signal as an input signal to each signal processing circuit 222. An extremely narrow-band band-pass filter 222*a* in each signal processing circuit 222 filters the input signal based on an operating frequency of the extremely narrow-band band-pass filter 222*a*, to obtain a filtered signal.

In each signal processing circuit 222, an envelope detector 222*b* extracts an amplitude envelope of the filtered signal output by the extremely narrow-band band-pass filter in the signal processing circuit, to obtain a baseband pulse signal, and then separately outputs the baseband pulse signal to n comparators 222*c* and correlators 222*d*.

In each comparator 222*c* and correlator 222*d*, the comparator 222*c* compares a voltage of the baseband pulse signal output by the envelope detector 222*b* with a reference voltage of the comparator 222*c*, to obtain a 0/1 level sequence, and outputs the 0/1 level sequence to the correlator; and the correlator 222*d* compares the 0/1 level sequence output by the comparator 222*c* with a wakeup sequence 2 locally stored in the mobile phone. If a correlation between the 0/1 level sequence and the wakeup sequence 2 is greater than a preset correlation threshold, the correlator 222*d* outputs a signal, for example, a digital signal 1, indicating that the wakeup signal is received. Otherwise, the correlator 222*d* outputs a signal, for example, a digital signal 0, indicating that the wakeup signal is not received.

A logical OR operation circuit 222*e* located in each signal processing circuit 222 performs a logical OR operation on output results of all the correlators 222*d* in the signal processing circuit 222, to obtain an output signal (0 or 1) of the signal processing circuit 222.

A logical OR operation circuit 223 performs a logical OR operation on output signals of all the signal processing circuits 222 to obtain an output signal 0 or 1. If the output signal 0 is obtained, a signal indicating that the wakeup signal is not received is output to a wakeup signal generator 224, and the wakeup signal generator 224 remains in an original state. If the output signal 1 is obtained, a signal indicating that the wakeup signal is received is output to the wakeup signal generator 224, and the wakeup signal generator 224 generates a signal for indicating to wake up the Wi-Fi module in the mobile phone, and sends the signal to a controller 230. The controller 230 controls, by using a control instruction, the Wi-Fi module in the mobile phone to enter a working state, controls the wakeup receiver to enter a sleeping state, and notifies the Wi-Fi router that the Wi-Fi module is woken up.

The Wi-Fi router sends the information A to the mobile phone. The Wi-Fi module in the mobile phone receives the information A, and sends the information A to the application a in the mobile phone.

If the Wi-Fi router subsequently does not have communication data to be sent to the Wi-Fi module in the mobile phone, the Wi-Fi module in the mobile phone automatically enters the sleeping state after waiting for a preset period of time, and notifies the controller 230 in the mobile phone. The controller 230 controls, by using a control instruction, the wakeup receiver 220 to enter the working state until the wakeup signal is received again, and a next process of waking up the Wi-Fi module in the mobile phone is performed.

It should be noted that the wakeup sequence 2 stored in the mobile phone includes a device ID 2 of the mobile phone. If a wakeup object of the Wi-Fi router is the mobile phone, the device ID 1 in the wakeup sequence 1 included in the wakeup signal transmitted by the Wi-Fi router is completely consistent with the device ID 2 in the wakeup sequence 2. If the wakeup receiver 220 in the mobile phone accurately receives the wakeup signal transmitted by the Wi-Fi router, a device ID in the 0/1 level sequence output by the comparator 222*c* in the mobile phone should be completely consistent with the device ID 1 in the wakeup sequence 1. However, because of a matching accuracy relationship between the reference voltage of the comparator 222*c* and a distance between the Wi-Fi router and the mobile phone, the device ID in the 0/1 level sequence output by the comparator 222*c* in the mobile phone may not be completely consistent with the device ID 1 in the wakeup sequence 1. Therefore, the device ID in the 0/1 level sequence output by the comparator 222*c* in the mobile phone may not be completely consistent with the device ID 2 in the wakeup sequence 2. Provided that a correlation indicator value between the device ID in the 0/1 level sequence output by the comparator 222*c* in the mobile phone and the device ID 2 in the wakeup sequence 2 is greater than the preset correlation threshold, it is considered that the wakeup signal transmitted by the Wi-Fi router is sent for the mobile phone.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or by driving hardware by using computer software depends on particular applications and design constraints of the technical solutions. A person skilled in the art may use different methods to implement the described functions with reference to embodiments for each particular application, but it should not be considered that the implementation goes beyond the scope of this application.

Figure 22:
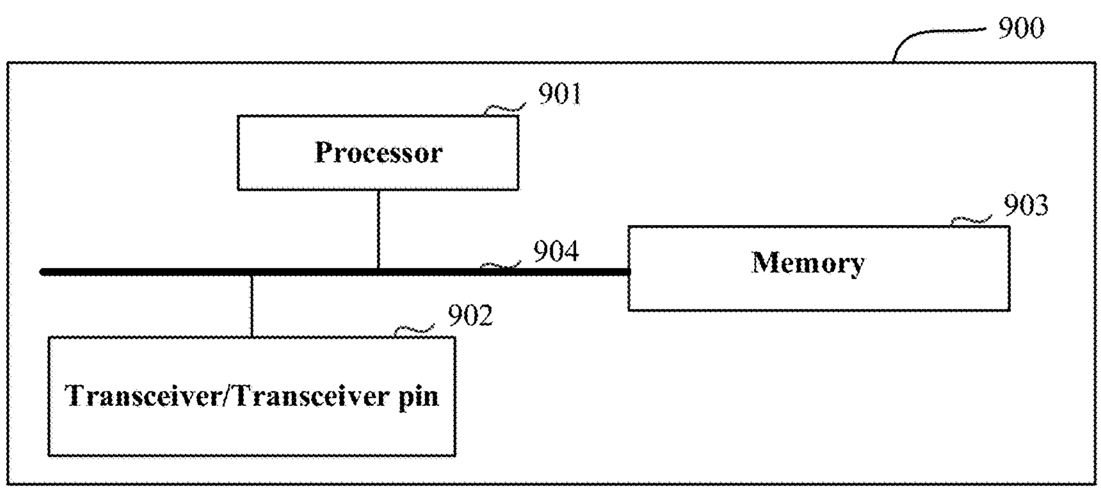
FIG. 22 is an example schematic block diagram of an apparatus 900 according to an embodiment of this application.

In an example, FIG. 22 is an example schematic block diagram of an apparatus 900 according to an embodiment of this application. The apparatus 900 may include a processor 901 and a transceiver/transceiver pin 902, and optionally, further includes a memory 903.

Components in the apparatus 900 are coupled together by using a bus 904. In addition to a data bus, the bus 904 further includes a power bus, a control bus, and a status signal bus. However, for clarity of description, various buses are referred to as the bus 904 in the figure.

Optionally, the memory 903 may be configured to store the instructions in the foregoing method embodiments. The processor 901 may be configured to: execute the instructions in the memory 903, control a receive pin to receive a signal, and control a transmit pin to send a signal.

The apparatus 900 may be the electronic device or a chip in the electronic device in the foregoing method embodiments.

All related content of the steps in the foregoing method embodiments may be cited to function descriptions of corresponding functional modules. Details are not described herein.

The electronic device, the computer storage medium, the computer program product, or the chip provided in the embodiments is configured to perform the corresponding method provided above. Therefore, for beneficial effects that can be achieved by the electronic device, the computer storage medium, the computer program product, or the chip, refer to the beneficial effects in the corresponding method provided above. Details are not described herein.

It may be understood by a person skilled in the art from the foregoing description of the implementations that, for convenience and brevity of the description, division of the foregoing functional modules is merely used as an example for description. In actual application, the foregoing functions may be allocated to different functional modules based on a requirement, that is, an internal structure of the apparatus is divided into different functional modules, so as to complete all or some of the functions described above.

In the embodiments provided in this application, it should be understood that the disclosed apparatuses and methods may be implemented in another manner. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may be one physical unit or may be a plurality of physical units, may be located at one position, or may be distributed on a plurality of different places. Some or all of the units may be selected based on actual requirements to achieve the objectives of the solutions of the embodiments.

In addition, functional units in the embodiments of this application may be integrated into one processing unit, each of the units may exist alone physically, or two or more units may be integrated into one unit. The foregoing integrated unit may be implemented in a form of hardware, or may be implemented in a form of a software functional unit.

Any content in the embodiments of this application and any content in the same embodiment may be freely combined. Any combination of the foregoing content falls within the scope of this application.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The storage medium includes various media that can store program code, for example, a USB flash drive, a removable hard disk, a read-only memory (read only memory, ROM), a random access memory (random access memory, RAM), a magnetic disk, or an optical disc.

The embodiments of this application are described with reference to the accompanying drawings. However, this application is not limited to the foregoing specific implementations. The foregoing specific implementations are merely examples, but are not limiting. Many forms made by a person of ordinary skill in the art under inspiration of this application and without departing from the objectives and the protection scope of the claims of this application shall fall within the protection scope of this application.

What is claimed is:

1. A wakeup method, comprising:

performing, by a first signal processing circuit, monitoring at a first frequency while performing, by a second signal processing circuit, monitoring at a second frequency, wherein the second frequency is different from the first frequency;

receiving, by the second signal processing circuit, a wakeup signal at the second frequency, wherein a bandwidth of the wakeup signal is less than a first value, the wakeup signal is transmitted by a first electronic device at a plurality of transmit frequencies or at a bandwidth greater than a second value, and the second value is greater than the first value;

performing, by the first signal processing circuit, monitoring at the second frequency while performing, by the second signal processing circuit, monitoring at a third frequency, wherein the third frequency is different from both the first frequency and the second frequency; and receiving, by the first signal processing circuit, the wakeup signal at the second frequency.

2. The method according to claim 1, further comprising:

outputting, by the first signal processing circuit, a first logical value, wherein the first logical value indicates that the first signal processing circuit receives the wakeup signal;

outputting, by the second signal processing circuit, a second logical value, wherein the second logical value indicates that the second signal processing circuit does not receive the wakeup signal; and determining, by a first logical OR operation circuit based on the first logical value and the second logical value, that the wakeup signal is received.

3. The method according to claim 1, wherein the first signal processing circuit comprises an extremely narrow-band band-pass filter, an envelope detector, a comparator, and a correlator, an input end of the extremely narrow-band band-pass filter is coupled to an antenna, an input end of the envelope detector is coupled to an output end of the extremely narrow-band band-pass filter, an input end of the comparator is coupled to an output end of the envelope detector, and an input end of the correlator is coupled to an output end of the comparator; and wherein receiving, by the first signal processing circuit, the wakeup signal at the second frequency comprises:

performing, by the extremely narrow-band band-pass filter, extremely narrow-band band-pass filtering on a first signal detected at the second frequency, to obtain a filtered signal with an extremely narrow bandwidth;

extracting, by the envelope detector, an amplitude envelope of the filtered signal to obtain a baseband pulse signal;

comparing, by the comparator, a voltage of the baseband pulse signal with a reference voltage to obtain a first digital signal sequence; and obtaining, by the correlator, a first correlation indicator value between the first digital signal sequence and a preset wakeup sequence, and comparing the first correlation indicator value with a preset correlation threshold to obtain a correlation comparison result, wherein when the correlation comparison result indicates that the first correlation indicator value is greater than the preset correlation threshold, the first signal is a wakeup signal.

4. The method according to claim 3, wherein the comparator comprises a first comparator and a second comparator, and an input end of the first comparator and an input end of the second comparator are separately coupled to the output end of the envelope detector; the correlator comprises a first correlator and a second correlator, an input end of the first correlator is coupled to an output end of the first comparator, and an input end of the second correlator is coupled to an output end of the second comparator; and the first signal processing circuit further comprises a second logical OR operation circuit, and an output end of the first correlator and an output end of the second correlator are separately coupled to an input end of the second logical OR operation circuit;

wherein comparing, by the comparator, the voltage of the baseband pulse signal with the reference voltage to obtain the first digital signal sequence comprises:

comparing, by the first comparator, the voltage of the baseband pulse signal with a first reference voltage to obtain a first candidate digital signal sequence; and comparing, by the second comparator, the voltage of the baseband pulse signal with a second reference voltage to obtain a second candidate digital signal sequence, wherein the second reference voltage is different from the first reference voltage; and wherein obtaining, by the correlator, the first correlation indicator value between the first digital signal sequence and the preset wakeup sequence, and comparing the first correlation indicator value with the preset correlation threshold to obtain the correlation comparison result, wherein when the correlation comparison result indicates that the first correlation indicator value is greater than the preset correlation threshold, the first signal is a wakeup signal, comprises:

obtaining, by the first correlator, a first candidate value of a first correlation indicator value between the first candidate digital signal sequence and the preset wakeup sequence, and comparing the first candidate value of the first correlation indicator value with the preset correlation threshold to obtain a first correlation comparison result;

obtaining, by the second correlator, a second candidate value of a first correlation indicator value between the second candidate digital signal sequence and the preset wakeup sequence, and comparing the second candidate value of the first correlation indicator value with the preset correlation threshold to obtain a second correlation comparison result; and performing, by the second logical OR operation circuit, a logical OR operation on the first correlation comparison result and the second correlation comparison result to obtain a first logical OR operation result, wherein when the first logical OR operation result indicates that at least one of the first candidate value of the first correlation indicator value or the second candidate value of the first correlation indicator value is greater than the preset correlation threshold, the first signal processing circuit receives the wakeup signal at the second frequency.

5. The method according to claim 1, wherein the first signal processing circuit comprises an extremely narrow-band band-pass filter, an envelope detector, a comparator, and a correlator, the comparator comprises an integrator circuit, an input end of the extremely narrow-band band-pass filter is coupled to an antenna, an input end of the envelope detector is coupled to an output end of the extremely narrow-band band-pass filter, an input end of the comparator is coupled to an output end of the envelope detector, and an input end of the correlator is coupled to an output end of the comparator; and wherein receiving, by the first signal processing circuit, the wakeup signal at the second frequency comprises:

performing, by the extremely narrow-band band-pass filter, extremely narrow-band band-pass filtering on a first signal detected at the second frequency, to obtain a filtered signal with an extremely narrow bandwidth;

extracting, by the envelope detector, an amplitude envelope of the filtered signal to obtain a baseband pulse signal;

converting, by the comparator, the baseband pulse signal into a single pulse signal, and comparing a voltage of the single pulse signal with a reference voltage to obtain a second digital signal sequence; and obtaining, by the correlator, a second correlation indicator value between the second digital signal sequence and a preset wakeup sequence, and comparing the second correlation indicator value with a preset correlation threshold to obtain a correlation comparison result, wherein when the correlation comparison result indicates that the second correlation indicator value is greater than the preset correlation threshold, the first signal is a wakeup signal.

6. The method according to claim 5, wherein the comparator comprises a third comparator and a fourth comparator, each of the third comparator and the fourth comparator comprises an integrator circuit, and an input end of the third comparator and an input end of the fourth comparator are separately coupled to the output end of the envelope detector; the correlator comprises a third correlator and a fourth correlator, an input end of the third correlator is coupled to an output end of the third comparator, and an input end of the fourth correlator is coupled to an output end of the fourth comparator; and the first signal processing circuit further comprises a second logical OR operation circuit, and an output end of the third correlator and an output end of the fourth correlator are separately coupled to an input end of the second logical OR operation circuit;

wherein converting, by the comparator, the baseband pulse signal into a single pulse signal, and comparing the voltage of the single pulse signal with the reference voltage to obtain the second digital signal sequence comprises:

converting, by the third comparator, the baseband pulse signal into a single pulse signal, and comparing a voltage of the single pulse signal with a third reference voltage to obtain a third candidate digital signal sequence; and converting, by the fourth comparator, the baseband pulse signal into a single pulse signal, and comparing a voltage of the single pulse signal with a fourth reference voltage to obtain a fourth candidate digital signal sequence, wherein the fourth reference voltage is different from the third reference voltage; and wherein obtaining, by the correlator, the second correlation indicator value between the second digital signal sequence and a preset wakeup sequence, and comparing the second correlation indicator value with the preset correlation threshold to obtain the correlation comparison result, wherein when the correlation comparison result indicates that the second correlation indicator value is greater than the preset correlation threshold, the first signal is a wakeup signal comprises:

obtaining, by the third correlator, a first candidate value of a second correlation indicator value between the third candidate digital signal sequence and the preset wakeup sequence, and comparing the first candidate value of the second correlation indicator value with the preset correlation threshold to obtain a third correlation comparison result;

obtaining, by the fourth correlator, a second candidate value of a second correlation indicator value between the fourth candidate digital signal sequence and the preset wakeup sequence, and comparing the second candidate value of the second correlation indicator value with the preset correlation threshold to obtain a fourth correlation comparison result; and performing, by the second logical OR operation circuit, a logical OR operation on the third correlation comparison result and the fourth correlation comparison result to obtain a second logical OR operation result, wherein when the second logical OR operation result indicates that at least one of the first candidate value of the second correlation indicator value and the second candidate value of the second correlation indicator value is greater than the preset correlation threshold, the first signal is a wakeup signal.

7. The method according to claim 1, wherein the first frequency and the second frequency are adjacent frequencies.

8. The method according to claim 1, wherein the first frequency and the second frequency are non-adjacent frequencies.

9. The method according to claim 1, wherein the plurality of transmit frequencies comprise at least one of the first frequency or the second frequency.

10. The method according to claim 1, wherein at least one of the first frequency or the second frequency falls within the bandwidth at which the first electronic device transmits the wakeup signal.

11. A wakeup apparatus, comprising:

a first signal processing circuit, wherein the first signal processing circuit is coupled to an antenna, and is configured to perform monitoring at a first frequency; and a second signal processing circuit, wherein the second signal processing circuit is coupled to the antenna, and is configured to perform monitoring at a second frequency, wherein the second frequency is different from the first frequency, and wherein:

the second signal processing circuit is further configured to receive a wakeup signal at the second frequency, wherein a bandwidth of the wakeup signal is less than a first value, the wakeup signal is transmitted by a first electronic device at a plurality of transmit frequencies or at a bandwidth greater than a second value, and the second value is greater than the first value;

the first signal processing circuit is further configured to perform monitoring at the second frequency;

the second signal processing circuit is further configured to perform monitoring at a third frequency, wherein the third frequency is different from both the first frequency and the second frequency; and the first signal processing circuit is further configured to receive the wakeup signal at the second frequency.

12. The apparatus according to claim 11, wherein:

the first signal processing circuit is further configured to output a first logical value, wherein the first logical value indicates that the first signal processing circuit receives the wakeup signal;

the second signal processing circuit is further configured to output a second logical value, wherein the second logical value is used to indicates that the second signal processing circuit does not receive the wakeup signal; and the apparatus further comprises:

a first logical OR operation circuit, wherein an input end of the first logical OR operation circuit is separately coupled to an output end of the first signal processing circuit and an output end of the second signal processing circuit, and the first logical OR operation circuit is configured to determine, based on the first logical value and the second logical value, that the wakeup signal is received.

13. The apparatus according to claim 11, wherein the first signal processing circuit comprises:

an extremely narrow-band band-pass filter, wherein an input end of the extremely narrow-band band-pass filter is coupled to the antenna, and the extremely narrow-band band-pass filter is configured to perform extremely narrow-band band-pass filtering on a first signal detected at the second frequency, to obtain a filtered signal with an extremely narrow bandwidth;

an envelope detector, wherein an input end of the envelope detector is coupled to an output end of the extremely narrow-band band-pass filter, and the envelope detector is configured to extract an amplitude envelope of the filtered signal to obtain a baseband pulse signal;

a comparator, wherein an input end of the comparator is coupled to an output end of the envelope detector, and the comparator is configured to compare a voltage of the baseband pulse signal with a reference voltage to obtain a first digital signal sequence; and a correlator, wherein an input end of the correlator is coupled to an output end of the comparator, and the correlator is configured to: obtain a first correlation indicator value between the first digital signal sequence and a preset wakeup sequence, and compare the first correlation indicator value with a preset correlation threshold to obtain a correlation comparison result, wherein when the correlation comparison result indicates that the first correlation indicator value is greater than the preset correlation threshold, the first signal is a wakeup signal.

14. The apparatus according to claim 13, wherein the comparator comprises:

a first comparator, wherein an input end of the first comparator is coupled to the output end of the envelope detector, and the first comparator is configured to compare the voltage of the baseband pulse signal with a first reference voltage to obtain a first candidate digital signal sequence; and a second comparator, wherein an input end of the second comparator is coupled to the output end of the envelope detector, and the second comparator is configured to compare the voltage of the baseband pulse signal with a second reference voltage to obtain a second candidate digital signal sequence, wherein the second reference voltage is different from the first reference voltage;

wherein the correlator comprises:

a first correlator, wherein an input end of the first correlator is coupled to an output end of the first comparator, and the first correlator is configured to: obtain a first candidate value of a first correlation indicator value between the first candidate digital signal sequence and the preset wakeup sequence, and compare the first candidate value of the first correlation indicator value with the preset correlation threshold to obtain a first correlation comparison result; and a second correlator, wherein an input end of the second correlator is coupled to an output end of the second comparator, and the second correlator is configured to: obtain a second candidate value of a first correlation indicator value between the second candidate digital signal sequence and the preset wakeup sequence, and compare the second candidate value of the first correlation indicator value with the preset correlation threshold to obtain a second correlation comparison result; and wherein the apparatus further comprises a second logical OR operation circuit, wherein an input end of the second logical OR operation circuit is separately coupled to an output end of the first correlator and an output end of the second correlator, and the second logical OR operation circuit is configured to perform a logical OR operation on the first correlation comparison result and the second correlation comparison result to obtain a first logical OR operation result, wherein when the first logical OR operation result indicates that at least one of the first candidate value of the first correlation indicator value or the second candidate value of the first correlation indicator value is greater than the preset correlation threshold, the first signal is a wakeup signal.

15. The apparatus according to claim 11, wherein the first signal processing circuit comprises:

an extremely narrow-band band-pass filter, wherein an input end of the extremely narrow-band band-pass filter is coupled to the antenna, and the extremely narrow-band band-pass filter is configured to perform extremely narrow-band band-pass filtering on a first signal detected at the second frequency, to obtain a filtered signal with an extremely narrow bandwidth;

an envelope detector, wherein an input end of the envelope detector is coupled to an output end of the extremely narrow-band band-pass filter, and the envelope detector is configured to detect an amplitude envelope of the filtered signal to obtain a baseband pulse signal;

a comparator comprising an integrator circuit, wherein an input end of the comparator comprising is coupled to an output end of the envelope detector, and the comparator is configured to: convert the baseband pulse signal into a single pulse signal, and compare a voltage of the single pulse signal with a reference voltage to obtain a second digital signal sequence; and a correlator, wherein an input end of the correlator is coupled to an output end of the comparator, and the correlator is configured to: obtain a second correlation indicator value between the second digital signal sequence and a preset wakeup sequence, and compare the second correlation indicator value with a preset correlation threshold to obtain a correlation comparison result, wherein when the correlation comparison result indicates that the second correlation indicator value is greater than the preset correlation threshold, the first signal is a wakeup signal.

16. The apparatus according to claim 15, wherein the comparator comprises:

a third comparator, wherein the third comparator comprises an integrator circuit, an input end of the third comparator is coupled to the output end of the envelope detector, and the third comparator is configured to: convert the baseband pulse signal into a single pulse signal, and compare a voltage of the single pulse signal with a third reference voltage to obtain a third candidate digital signal sequence; and a fourth comparator, wherein the fourth comparator comprises an integrator circuit, an input end of the fourth comparator is coupled to the output end of the envelope detector, and the fourth comparator is configured to: convert the baseband pulse signal into a single pulse signal, and compare a voltage of the single pulse signal with a fourth reference voltage to obtain a fourth candidate digital signal sequence, wherein the fourth reference voltage is different from the third reference voltage;

wherein the correlator comprises:

a third correlator, wherein an input end of the third correlator is coupled to an output end of the third comparator, and the third correlator is configured to: obtain a first candidate value of a second correlation indicator value between the third candidate digital signal sequence and the preset wakeup sequence, and compare the first candidate value of the second correlation indicator value with the preset correlation threshold to obtain a third correlation comparison result; and a fourth correlator, wherein an input end of the fourth correlator is coupled to an output end of the fourth comparator, and the fourth correlator is configured to: obtain a second candidate value of a second correlation indicator value between the fourth candidate digital signal sequence and the preset wakeup sequence, and compare the second candidate value of the second correlation indicator value with the preset correlation threshold to obtain a fourth correlation comparison result; and wherein the apparatus further comprises a second logical OR operation circuit, wherein an input end of the second logical OR operation circuit is separately coupled to an output end of the third correlator and an output end of the fourth correlator, and the second logical OR operation circuit is configured to perform a logical OR operation on the third correlation comparison result and the fourth correlation comparison result to obtain a second logical OR operation result, wherein when the second logical OR operation result indicates that at least one of the first candidate value of the second correlation indicator value and the second candidate value of the second correlation indicator value is greater than the preset correlation threshold, the first signal is a wakeup signal.

17. The apparatus according to claim 11, wherein the first frequency and the second frequency are adjacent frequencies.

18. The apparatus according to claim 11, wherein the first frequency and the second frequency are non-adjacent frequencies.

19. The apparatus according to claim 11, wherein the plurality of transmit frequencies comprise at least one of the first frequency or the second frequency.

20. The apparatus according to claim 11, wherein at least one of the first frequency or the second frequency falls within the bandwidth at which the first electronic device transmits the wakeup signal.

* * * * *